United States Patent
Denoual et al.

(10) Patent No.: US 8,341,129 B2
(45) Date of Patent: Dec. 25, 2012

(54) METHODS OF CODING AND DECODING A STRUCTURED DOCUMENT, AND THE CORRESPONDING DEVICES

(75) Inventors: Franck Denoual, Saint Domineuc (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 566 days.

(21) Appl. No.: 12/570,708

(22) Filed: Sep. 30, 2009

(65) Prior Publication Data

US 2010/0083101 A1    Apr. 1, 2010

(30) Foreign Application Priority Data

Sep. 30, 2008    (FR) .................................... 08 56606

(51) Int. Cl.
*G06F 17/00* (2006.01)
(52) U.S. Cl. ............. 707/693; 707/756; 707/791
(58) Field of Classification Search ............ 707/693, 707/756, 791
See application file for complete search history.

(56) References Cited

U.S. PATENT DOCUMENTS

| | | | |
|---|---|---|---|
| 6,883,137 B1 * | 4/2005 | Girardot et al. ............... | 715/242 |
| 7,133,857 B1 * | 11/2006 | Zhang et al. ................ | 715/234 |
| 7,620,652 B2 * | 11/2009 | Zhang et al. ................ | 1/1 |
| 7,647,552 B2 * | 1/2010 | Wan ............................. | 715/234 |
| 7,831,540 B2 * | 11/2010 | Medi et al. .................... | 707/601 |
| 7,873,663 B2 * | 1/2011 | Willis et al. .................. | 707/791 |
| 7,886,223 B2 * | 2/2011 | Shetty et al. ................. | 715/234 |
| 7,925,643 B2 * | 4/2011 | Balegar et al. ............... | 707/713 |
| 7,933,933 B2 * | 4/2011 | Petride et al. ................ | 707/803 |
| 2002/0138517 A1 * | 9/2002 | Mory et al. ................... | 707/513 |
| 2003/0046317 A1 * | 3/2003 | Cseri et al. ................... | 707/513 |
| 2004/0028049 A1 * | 2/2004 | Wan ............................. | 370/394 |
| 2004/0054692 A1 * | 3/2004 | Seyrat et al. ................. | 707/104.1 |
| 2004/0103105 A1 * | 5/2004 | Lindblad et al. ............ | 707/100 |
| 2004/0143791 A1 * | 7/2004 | Ito et al. ....................... | 715/513 |
| 2005/0182778 A1 * | 8/2005 | Heuer et al. .................. | 707/101 |
| 2005/0228811 A1 * | 10/2005 | Perry ............................ | 707/101 |
| 2005/0268341 A1 * | 12/2005 | Ross ............................. | 726/26 |
| 2005/0278616 A1 * | 12/2005 | Eller ............................. | 715/513 |
| 2006/0031756 A1 * | 2/2006 | Dirstine ........................ | 715/513 |
| 2006/0085737 A1 * | 4/2006 | Liu ............................... | 715/513 |
| 2006/0129689 A1 * | 6/2006 | Ho et al. ....................... | 709/230 |
| 2006/0168513 A1 * | 7/2006 | Coulson et al. ............... | 715/513 |
| 2008/0010256 A1 * | 1/2008 | Lindblad et al. .............. | 707/3 |
| 2008/0098001 A1 * | 4/2008 | Gupta et al. .................. | 707/10 |
| 2008/0098029 A1 | 4/2008 | Ruellan ........................ | 707/102 |

(Continued)

OTHER PUBLICATIONS

Luoma, O., et al., "Predictive Modeling in XML Compression", Digital Information Management, Oct. 28, 2007, pp. 565-570.

Schneider, J., et al., "Efficient XML Interchange (EXI) Format 1.0", W3C Working Draft, <available at: http://www.w3.org/TR/2007/WD-exi-20070716/>, Jul. 16, 2007.

(Continued)

*Primary Examiner* — Thanh-Ha Dang

(74) *Attorney, Agent, or Firm* — Fitzpatrick, Cella, Harper & Scinto

(57) ABSTRACT

A structured document is coded as a bit stream. The structured document can be described in Extensible Markup Language (XML). The structured document can be decoded to access a subpart of the document. Hierarchized events included in the structured document are coded as corresponding events using at least one encoding table, which is updated during the coding. Hierarchized events involved in an update of the at least one encoding table are determined. Marking information is associated with the coded events corresponding to the hierarchized events determined to be involved in the update of the at least one encoding table.

21 Claims, 11 Drawing Sheets

U.S. PATENT DOCUMENTS

| | | | |
|---|---|---|---|
| 2008/0120608 A1* | 5/2008 | Shetty et al. | 717/144 |
| 2008/0140645 A1 | 6/2008 | Denoual | 707/5 |
| 2008/0148141 A1* | 6/2008 | Heuer et al. | 715/234 |
| 2008/0250055 A1 | 10/2008 | Ruellan et al. | 707/102 |
| 2008/0320031 A1 | 12/2008 | Denoual | 707/102 |
| 2009/0112890 A1* | 4/2009 | Medi et al. | 707/100 |
| 2009/0177942 A1* | 7/2009 | Hannuksela et al. | 714/752 |
| 2009/0222419 A1* | 9/2009 | Lam et al. | 707/3 |
| 2009/0254882 A1 | 10/2009 | Ruellan | 717/120 |
| 2009/0307244 A1* | 12/2009 | Balegar et al. | 707/101 |
| 2010/0107052 A1* | 4/2010 | Uchida | 715/234 |

OTHER PUBLICATIONS

Ng., W., et al., "XCQ: A queriable XML compression system", Knowledge and Information Systems; an International Journal, vol. 10, No. 4, Mar. 15, 2006, pp. 421-452.

Peintner, D., "RE: Question about EXI Draft-Position of Self-Contained", W3C Public Forum, <available at: http://lists.w3.org/Archives/Public/public-exi-comments/2009Apr/0000.html>, Apr. 2, 2009.

* cited by examiner

Fig 3B

| | |
|---|---|
| 102 | XML Events |
| 204 | Recovery of type |
| 210 | Recovery of name |
| | XML analyser |
| 216 | Recovery of value |
| 222 | Indexing of EXI events |
| 106 | EXI Index |
| 224 | Compression of index |
| 206 | Encoding of priorities |
| 208 | Grammars |
| 212 | Encoding of names |
| 214 | Dictionaries of strings |
| 218 | Encoding of values |
| 220 | Bit generator |
| 110 | EXI events |
| 108 | Indexed EXI stream |

METHODS OF CODING AND DECODING A STRUCTURED DOCUMENT, AND THE CORRESPONDING DEVICES

FIELD

The present invention concerns a method and a corresponding device for coding a structured document, a method and device for decoding such a coded document, in particular for accessing a sub-part of the document, and a data structure of such a coded document.

It applies in particular to structured documents of the XML type (the acronym for "eXtensible Markup Language").

An XML document is made of elements, each element starting with an opening tag comprising the name of the element (for example: <tag>) and ending with a closing tag also comprising the name of the element (for example: </tag>). Each element can contain other elements, referred to as "child elements" (affiliation terminology, "parent", "child", being used to describe the relationships between the embedded elements) or text data. Each element can also contain text data, for example in the form of a character string.

Moreover, an element may be specified by attributes, each attribute being defined by a name and having a value. The attributes are placed in the opening tag of the element that they specify (for example: <tag attribute="value">).

XML syntax also makes it possible to define comments (for example: <!--Comment-->) and processing instructions, which may specify to a computer application the processing operations to be applied to the XML document (for example: "<?myprocessing?>"), as well as escape sections that prevent a section of text from being interpreted as a tag when it has the form of a tag (for example: "<![CDATA[<text>Escape</text>]]>" where <text> is recognised as a character string rather than a tag).

It is considered hereinafter that XML data are described in terms of "items" or "events", each item or event being able to be a start of element (for example <tag>), an end of element (for example </tag>), an attribute (for example attribute="value"), a text content, a comment, a processing instruction or an escape section.

Several different languages based on XML may contain elements with the same name. In order to be able to mix several different languages, an addition has been made to the XML syntax for defining Namespaces. Two elements are identical only if they have the same name and belong to the same namespace. A namespace is defined by a URI (the acronym for "Uniform Resource Identifier"), for example "http://canon.crf.fr/xml/mylanguage". The use of a namespace in an XML document needs the definition of a prefix that is a shortcut to the URI of this namespace. This prefix is defined by means of a specific attribute (for example: the attribute "xmlns:ml="http://canon.crf.fr/xml/mylanguage" associated with the prefix "ml" at the URI "http://canon.crf.fr/xml/mylanguage"). Next, the namespace of an element or attribute is specified by preceding its name with the prefix associated with the namespace followed by ":" (for example: "<ml:tag ml:attribute="value">" indicates that the element tag results from the namespace ml and that the same applies for the attribute attribute).

Hereinafter, the "name" of an element or of an attribute means the name provided or not with this namespace prefix.

XML has many advantages and has become a reference language for storing data in a file or for exchanging data. XML makes it possible in particular to have available many tools for processing the files generated. In particular, an XML document can be edited manually with a simple text editor. In addition, as an XML document contains its structure integrated in the data, this document is very legible even without knowing its specification.

The main drawback of XML syntax is being very prolix. Thus the size of an XML document may be several times greater than the intrinsic size of the data. This large size of XML documents also gives rise to a long processing time when XML documents are generated and read. It also gives rise to a long transmission time.

To remedy these drawbacks, other methods for encoding an XML document have been sought. The aim of these methods is to code the content of the document in a more effective form, whilst making it possible to reconstruct the XML document easily. However, the majority of these methods do not keep all the advantages of the XML format.

Among these methods, the most simple consists of coding the structure data in a binary format instead of using a text format. In addition, the redundancy of the structural information in the XML format may be eliminated or at least reduced (for example, it is not necessarily useful to specify the name of the element in the opening tag and closing tag).

Another method is to use an index table, in particular for the names of elements and attributes, which are generally repeated in an XML document. Thus, at the first occurrence of an element name, this is coded normally in the file and an index is associated with it. Then, for following occurrences of this element name, the index is used in place of the complete string, reducing the size of the document generated but also facilitating reading (there is no longer any need to read the complete string in the file and in addition the element read can be determined by a comparison of integers instead of a comparison of character strings).

Finally, beyond these elementary methods, there exist more advanced methods consisting in particular of taking into account a larger number of items of structural information of the document in order to compress the data further. The case can be cited of the EXI (standing for Efficient XML) recommendation, a format used as a basis for the standardisation of a binary XML format by the EXI (the acronym for "Efficient XML Interchange") working group of the W3C (the acronym for "World Wide Web Consortium", the organisation producing standards for the Web), or the "Fast Infoser" binary XML format, specified by the ITU-T standard Rec X.891|ISO/IEC 24824-1.

These advanced XML binary compression methods (Fast Infoset, EXI) are being used more and more for storing and exchanging XML data more effectively both in terms of data sizes and in terms of reading speed.

The EXI recommendation, available through the document "Efficient XML Interchange (EXI) Format 1.0—W3C Working Draft 28 Jul. 2008", takes into account the order of appearance of the various events within a structured document in order to construct one or more grammars that make it possible to encode the most frequent events in a small number of bits.

A grammar is composed of a set of productions, each production comprising an XML event description, an associated coding value and the indication of the following grammar to be used. To code an XML event using a grammar, the production containing the most precise description of the XML event is used. The coding value contained in this production is used to represent the event in the coded bit stream, and the information contained in the event and not described in the production are coded subsequently.

A grammar according to Efficient XML is evolving. In a certain number of cases, after the occurrence of an XML event already described by a production of the grammar (if it is not described by a production, it cannot be encoded by the grammar), the grammar is modified to include a new more effective production corresponding to this XML event. This production can either contain a more precise description of the event, reducing the number of items of information to be coded for representing the event, or have a more compact coding value.

The coding values, or "codes", are expressed in the form of "priorities" generally having between 1 and 3 levels. Coding a coding value amounts to coding the values of its priority. Each level is coded in the minimum number of bits to be able to code the highest value of this level associated with a production of the grammar. Thus, for a level taking values from 0 to 6, three coding bits are used.

To code an XML document a set of grammars is used. A few grammars serve to code the structure particular to the XML document. In addition, for each type of XML event present in the document (a type of XML element being a set of events having the same name), a set of grammars is used to code the XML events of this type.

A set of dictionaries of strings is also used for encoding the names of events and contents of the XML document. These dictionaries also develop through the incorporation of new strings encountered in the document and coded.

The grammar rules used may either be generic rules common to all the XML documents and constructed for the XML syntax, or be rules specific to a type of document, constructed from an XML schema describing the structure of this type of document.

During decoding, the reverse process is used: the coding value is extracted and makes it possible to identify the XML event coded, as well as the complementary information to be decoded.

In addition, during decoding, the same rules for development of the grammars and dictionaries of strings are used, making it possible to have at any time a set of grammar and dictionary rules identical to the one that was used during coding.

By way of example, the following XML fragment is used to describe the coding of an XML document by means of the EXI specification:

```
<person>
    <firstname>John</firstname>
    <lastname>Smith</lastname>
</person>.
```

Since the encoder has not yet encountered a "person" event, here a start of element <person>, a default grammar is created for this event. This is a grammar containing only generic productions. During the encoding of the element "person", new productions are created and inserted to make the grammar linked to the element "person" more effective. The default grammar used for coding the content of the element "person" is as follows (simplified compared with the Efficient XML specification):

| ElementContent: | |
|---|---|
| EE | 0 |
| SE(*) ElementContent | 1.0 |
| CH ElementContent | 1.1 |

"EE" corresponds to the end of element event, "SE (*)" corresponds to any start of element event (generic, and the name is therefore not specified), and "CH" corresponds to a text content event.

The grammar thus created is stored in a table, for example in the volatile memory of the encoder.

During encoding, after having received the event corresponding to the start of element "person" (SE (person)), and having coded it for example literally (or by means of an appropriate grammar of higher level), the encoder selects the coding grammar of the content of the element "person", described above.

Next the encoder receives the event corresponding to the start of element "firstname" (SE(firstname)). The production that corresponds to this event in the above grammar is the second:

SE(*) ElementContent 1.0

The encoder will therefore code the priority "1.0". As the first priority level comprises two distinct values ("0" and "1") among the productions of the grammar, this level can be coded over one bit, with the value "1". Likewise, the second priority level comprises two distinct values and can be coded in one bit, with the value "0". The priority "1.0" is therefore coded here with the two bits "10".

Next, as the production does not specify the name of the element, "firstname" is coded, for example literally (and/or using a dictionary of strings referencing all or some of the character strings), using the production CH ElementContent 1.1

The encoding of the content of "firstname" is then pursued. For this purpose, the rule associated within this element is sought. As no element "firstname" has been encountered, a "firstname" grammar is created from the default grammar. The element "firstname" contains a text node for a single child. This text node is encoded, for example by means of a dictionary of strings in which the text value is associated with a first index. Once this text node is encoded, the grammar of "firstname" is updated by inserting a text production CH.

| "firstname" Grammar ElementContent: | |
|---|---|
| Characters | 0 |
| EE | 1 |
| SE(*) ElementContent | 2.0 |
| CH ElementContent | 2.1 |

Once the content of "firstname" has been coded, the encoder modifies the grammar associated with the element "person" in order to adapt the grammar to the XML data encountered. For this purpose, a new production is added to the grammar, this production corresponding to the start of the element "firstname". The priority "0" is associated with this production, and the other priorities are offset in order to preserve unicity of priorities. The decoder acting symmetrically will be in a position to achieve similar offsets of priorities (or indices) as the data received are decoded. Thus the grammar becomes:

| "person" Grammar ElementContent: | |
|---|---|
| SE (first name) ElementContent | 0 |
| EE | 1 |
| SE(*) ElementContent | 2.0 |
| CH ElementContent | 2.1 |

The following event of the XML fragment to be coded is the start of the element "lastname". As for "firstname", this element is coded by means of the production:

SE(*) ElementContent 2.0 since no production corresponding to the element "lastname" is found.

The first priority level now having three possible values, it is coded in two bits, with the value "2". The second priority level is still coded over only one bit. The priority "2.0" is therefore coded here with the three bits "100".

The name of the element, "lastname", is next coded for example literally in binary. Then the content of "lastname" is coded by means of the grammar associated with the element "lastname", to be created if necessary at the first iteration, in a similar fashion to that described above for "firstname".

Next the grammar "person" is modified in order to add thereto a production corresponding to the start of the element "lastname" and then becomes:

| "person" Grammar ElementContent: | |
|---|---|
| SE (lastname) ElementContent | 0 |
| SE (firstname) ElementContent | 1 |
| EE | 2 |
| SE(*) ElementContent | 3.0 |
| CH ElementContent | 3.1 |

Next, the end of element event, corresponding to the end of the element "person", is coded, using the production:

EE 2

It should be noted that all the productions of the grammar with the exception of the latter production comprise the description of an event, the associated code and the following grammar to be used. This following grammar is used for continuing the coding after the coding of the event included in the production.

However, in the case of an event describing a start of element, the grammars specific to this element are used for coding the content of element. The following grammar indicated in the production comprising the start of element event is used for the coding after the end of this element.

Thus the production comprising the end of element event does not contain a following grammar: the grammar to be used for coding the rest of the document is the one that had been indicated by the grammar of the parent element in the production used for coding the start event of this element.

If subsequently, in the XML document, the coder encounters another similar element "person", this element will be coded from this grammar. Thus the first event corresponding to the content of the element "person" is the start event of the element "firstname". This element is coded with the production:

SE(firstname) ElementContent 1

It will be noted that the production

SE(*) ElementContent 3.0 also corresponds to this event, but is less precise (it does not specify the name "firstname" of the element). It is therefore the first production that is used for increased coding efficacy.

The encoder therefore encodes the priority of this production, namely the value "1", which is coded in two bits (since it takes values from 0 to 3), that is to say "01". There is no need to code the name of the element since this is specified by the production itself and is clear from the initial literal coding when the element "firstname" has been encountered for the first time.

The encoder next codes the content of the element "firstname".

As a production specific to the start event of the element "firstname" already exists in the grammar, it is not necessary to add a new production to the grammar.

The encoder next codes, in a similar manner, the start event of the element "lastname", coding solely the priority "0" with the two bits "00".

Thus, for the coding of the second element "person" similar to the first, the code generated is more compact since it is no longer necessary to code the name of the elements contained in "person", neither literally (by coding the entire character string) nor even using an index.

Other productions, for example those relating to the attributes: AT(*)ElementContent, are also used when corresponding events are present in the XML document.

Dictionaries of strings group together the various values of strings encountered and their associated binary codes are also provided, sometimes specialized as a dictionary of elements (containing the names of the structure elements), a dictionary of attributes (containing the names of the attributes), a dictionary of content (containing the text data), etc.

Subsequently the grammars, productions, dictionaries of strings provided for by EXI, the index tables provided for by Fast Infoset and any other equivalent encoding structure used by binary XML coding algorithms are grouped together, under the term encoding (or decoding where applicable) tables or dictionaries.

The sophisticated XML binary compression methods (Fast Infoset, EXI) do not however make it possible to easily decode only the subparts of a binary XML document thus generated. However, partial decoding may prove to be very useful when only a subpart of a document is useful to the application handling it. Such partial accesses are generally numerous for one and the same XML binary document. This is the case for example with processing of XPath or XQuery requests on binary XML documents.

This is because, if for example the EXI encoding algorithm is considered as seen above, the coder maintains, during encoding, various encoding tables (dictionaries and grammars): some for the strings of values (text node values, attribute values, names of elements and attributes, definition of the URIs of the namespaces, etc) and others for the information describing the structure of the document (grammars of productions).

In order to provide a high compression ratio, these encoding tables are not transmitted to the decoder, which must, on the same schema as the coder, reconstruct them (during decoding, these tables can also be called decoding tables) as decoding progresses. This implies that, when it is wished to begin to reconstruct the document from a given position, the decoder must all the same run through the entire start of the document up to the required position so that its decoding tables are in the state corresponding to this position (that is to say comprising all the required grammars/productions and coded character strings) to allow the reconstruction of the portion of the document commencing at this position.

It is therefore sought to improve the recovery of the subparts of the XML binary document, and in particular to improve the coding of a structured document in order to facilitate such a recovery.

Mechanisms for recovering subparts in an uncoded XML document are already known, for example through the document U.S. Pat. No. 7,133,857. These mechanisms are based on the use of an indexing of the structure information of the XML document produced in the form of a binary file. Each entry of the index (binary file) stores in particular a position in the XML document, the depth of the corresponding block of data, a modification indicator, an insertion indicator (to describe the child nodes) and an end of document indicator.

Thus, when software wishes to access a subpart of the XML document, it relies on the binary indexing file in order in particular to determine the depth of the elements to be recovered. This mitigates the drawbacks of the parsers of the DOM type which are greedy in resources in order to represent the structure of the XML document in hierarchical tree form and the drawbacks of the SAX-type parsers not relying on the hierarchization of the data in the document.

Nevertheless, this solution was developed for non-compressed structured documents and does not therefore take account of the constraints relating to compression (quantity of data, compressed values to be decoded during access).

There is also known, in the aforementioned EXI recommendation, the "self-contained" option used through a particular type of EXI event (called SC) to code the events of an XML document. By using this type of EXI event, it is possible to perform an independent encoding of one or more XML events, that is to say each event thus coded is self-descriptive. Thus it is no longer necessary, for the encoder receiving the encoded stream, to read the start of the bit stream in order to access an XML event encoded by the EXI event of the "SC" type.

Nevertheless, this solution may pose problems of interoperability between coders and decoders, since the "self-contained" option is an extension of the EXI standard that is not always accepted by decoders.

In addition, a large number of items of information is statistically necessary for coding such self-descriptive events, in particular information for each of the events of the XML document. The result is an appreciable reduction in the efficacy of compression.

SUMMARY

The invention aims to overcome at least one of the aforementioned drawbacks by supplementing the coded bit stream with information enabling the decoder to configure itself rapidly and at less cost in an adapted state, given a position from which it must reconstruct the XML document.

For this purpose, the invention concerns in particular a method of coding a document structured as a bit stream, comprising the coding of hierarchized events composing the structured document as corresponding events coded by means of at least one encoding table, said at least one encoding table being updated during the coding of certain hierarchized events, the method being characterized in that it comprises the following steps:
- the determination of the hierarchized events involved in the updating of the at least one encoding table;
- the association of marking information with the coded events corresponding to said determined hierarchized events.

It should be noted that generally the encoding tables or the dictionaries are updated at the first occurrence of a new hierarchized event or a new event value that it is wished to index in a dictionary. Nevertheless, some values may never be indexed since indexing them would not be profitable for compression.

According to the invention, the decoder receiving the bit stream thus coded with the marking information quickly has available a high-level representation of the structured document, from this marking information, making it possible in particular to choose an access position therein. In addition, from the marking information, the decoder wishing to access a subpart quickly takes stock of the various events useful to the formation of the necessary decoding tables, mainly those contributing to the updating of the encoding tables and situated upstream of the access position in the bit stream.

The result is access in the bit stream, only to these marked events rather than to the very start of the coded document.

The present invention makes it possible to keep good compression of the structured documents whilst facilitating accesses, possible numerous, to subparts of the coded document.

In one embodiment, the method comprises the following steps:
- the construction of an indexing table of said coded events, said indexing table comprising, for a plurality of coded events, information representing the position of said coded event in the bit stream and information representing the involvement or not, in an updating of at least one encoding table, of the corresponding hierarchized event, and
- the addition of said indexing table to said bit stream.

In this configuration, all the information enabling the decoder to accelerate access to the structured document is grouped together in the same index, hereinafter referred to as the "indexing table". Processing of this information by the decoder is thus further facilitated thereby.

The indexing mechanism according to the invention thus supplies entry points in the bit stream by means of the inclusion of an indexing table in this stream.

According to a particular characteristic, said plurality of coded events comprises a plurality of hierarchized events relating to the structure of said document, and said indexing table also comprises, for coded events relating to the content of said document, solely information representing their position in the bit stream. The content events, generally the text data of the XML document, are here solely indexed by the mention relating to their position in the stream. This is because, the text data rarely being identical, it has appeared more effective to consider them all as contributing to an updating of the tables (the decoder detecting the exceptions) rather than increasing the size of the index by indicating this contribution.

In one embodiment, said indexing table also comprises, for the plurality of coded events, identification data for the name of the corresponding hierarchized event. By means of this identification data, the indexing table reconstituted by the decoder for accessing an entry point of the document can be optimized, at the decoder, by the discarding of the event similar to the event that is directly the parent of the access point and not contributing to the updating of the encoding tables, whilst keeping the hierarchy of the events up to the access point in order, for example in the EXI case, to ensure correct stacking of the grammars.

According to one characteristic, said indexing table gives information, for each coded event in said plurality, on the corresponding type of event and the depth of said corresponding event in the hierarchical structure of said document.

In an embodiment also applying to marking in the broad sense of the word according to the invention, said at least one encoding table comprises an encoding table of structure events and an encoding table of character strings, and said information representing the involvement takes a different value for representing the involvement of an updating of at least one encoding table including said encoding table of structure events and for representing the involvement of an updating solely of a character-string encoding table.

A structure-event encoding table can consist of a grammar in the EXI sense, while a string-encoding table can be a value-indexing dictionary. In this configuration, there are thus the contributions/involvements relating to the structure of the document (for example the creation of a new production in the EXI sense) and the contributions relating only to a new value (character string). The construction of the decoding tables by the decoder is thus simpler.

In particular, said information representing the involvement is coded, in the case of updating of the structure event coding table, in a smaller number of bits that in the absence of updating of such an encoding table. This configuration is particularly well suited to irregular structured documents since the events modifying the encoding tables relating to the structure of the document, the creation of new EXI productions for example, are thus favored for minimum compression.

In a variant, said information representing the absence of involvement is encoded in a smaller number of bits than the information representing the involvement of an updating of structure-event encoding tables. This variant is particularly well suited to regular structured documents since it favors, for the compression of the XML document, events not affording modification/updating of the encoding (and therefore decoding) tables.

In an embodiment improving the compression of the total bit stream (including the indexing table), the method comprises a step of compressing said indexing table before it is added to said bit stream.

In particular, during said compression, the entries to the indexing table are grouped according to the corresponding event type and the depth of said corresponding event in the hierarchical structure of said document, and each group is coded independently. Here the redundancy of the event and depth type information is used to reduce the coded information, in this way improving the efficacy of the compression of the index. It should be noted that only one grouping per type of event or per depth can be envisaged for a lesser index compression.

According to a particular characteristic, in each group, the information representing the position of the coded events are coded by difference with respect to the first position in the group. In this way the number of bits necessary for the coding of the position information is reduced. The compression of the indexing table is improved thereby.

In a similar fashion, provision is made for said name identification data to be a value and, in each group, the identification data of the names of the coded events are coded by difference with respect to the identification data of the most frequent name in the group.

Thus the compression ratio of the indexing table is increased, since the value will have to be coded numerous times since it is obtained for each occurrence of the most frequent identification data item.

In a particular embodiment making provision for limiting the size of the indexing table, the following are coded:
the entries of the indexing table where the depth of the corresponding event in the hierarchical structure of the document is less than a threshold depth, and
the entries of the indexing table with a depth greater than or equal to the threshold depth and where the information representing the involvement corresponds to an updating of the at least one encoding table.

Thus the events with an excessively deep hierarchical level, generally numerous, are not indexed. On the other hand, in order to keep all the efficiency of the decoder, the information "necessary" to the reconstruction of the decoding table is transmitted, that is to say the events contributing to an updating of the encoding tables.

In one embodiment, said indexing table, possibly compressed, is inserted in the header of said bit stream.

This configuration assures that the bit stream remains in compliance with, for example, the EXI recommendation and therefore compatible with coders not implementing the invention. In addition, the decoder thus quickly has available the high-level representation of the structured document for performing effective decodings on the fly, even if the remainder of the bit stream has not yet been loaded.

According to various embodiments, provision can be made for:
said information representing the position to indicate the position of the first bit of the code representing the encoded event;
said information representing the position to indicate the position of the first bit of a priority code used for encoding the event.

The invention also relates to a method of decoding a portion of a bit stream comprising coded events coding a structured document, the method comprising the following steps:
the determination, in said bit stream, of coded events associated with marking information;
the construction of at least one decoding table by, in said bit stream, decoding only determined coded events; and
the decoding of said portion by means of at least one constructed decoding table.

Thus, according to the invention, the decoding tables are reconstructed by accessing only marked coded events rather than all the events of the start of the document preceding the access point. Detecting the marking is a less expensive operation than running through the whole of the start of the document up to the access position.

It is possible in particular to filter the determined events according to their respective positions in the bit stream, their marking information and a position representing the stream portion to be accessed, and to use these filtered events for the construction step. By means of this filtering, the number of events to be decoded for supplying the decoding tables in the state corresponding to the required access position is reduced.

The construction of the decoding tables can in particular comprise the decoding of the marked events at said positions in the bit stream and the addition, to the decoding tables, of decoding data corresponding to said events thus decoded. This corresponds to conventional decoding applied solely to the marked events.

Optionally, the method can comprise steps symmetrical to those relating to the characteristics of the coding method disclosed above.

In particular, said determination comprises the decoding of an indexing table included in said bit stream, said indexing table comprising, from a plurality of coded events, information representing the position of said coded event in the bit stream and said marking information of said coded event. As explained previously, the use of an indexing table simplifies the processing operations performed by the decoder.

According to a particular characteristic, said indexing table is filtered so as to keep, for the construction step, only the coded events whose corresponding position precedes that of the first event of the portion of bit stream to be accessed. In this way, the number of accesses to the coded events (and therefore the associated decoding operations) are limited to those that are prima facie useful since they precede the access point.

According to a characteristic in a variant, said indexing table is filtered so as to keep, for the construction step, only the coded events whose corresponding position precedes that of the last event of the portion of bit stream to be accessed. In this embodiment, it is possible to obtain decoding tables already containing all the coding information relating to the subpart to be accessed. Thus, once the tables are constructed, the decoding proper of the subpart to be accessed is more rapid.

In a particular embodiment, the coded events of said indexing table are associated with depth information representing the depth of the event in the structure of the structured document and, in the method, said indexing table is also filtered so as to keep only the coded events whose marking information is at least of a first type and the coded events that are ancestors, in said structure, of said first event to be accessed whose marking information is of a second type. Generally, the first type corresponds to an indication that the associated event corresponds to an updating of the encoding/decoding tables, whereas the second type corresponds to events not updating these same tables.

Thus, in this embodiment, the events processed by the decoder are minimized to those that are only necessary for updating the decoding tables (the events of the first type) and to those that are necessary for keeping the ordering in the structure data of the document (the events of the second type). The latter events make it possible, for example in the context of EXI, to change grammars as the structure is run through, in order to update the correct decoding tables with the other events.

In one embodiment of the invention, said construction comprises the updating of a plurality of decoding tables by adding decoding data associated with the decoded events and, prior to the decoding of a filtered coded event, at least one decoding table to be updated is determined from the marking information type. In this configuration, the processing is accelerated at the decoder since, for each processed coded event, the decoding tables to be updated are determined, by means of the marking information, prior to access to the coded event. This determination can in particular be carried out in parallel to the decoding of the filtered event.

According to one characteristic of the invention, the coded events of said indexing table are associated with hierarchical depth information and the method comprises the construction and display of a hierarchical structure using said depth information so that a user can, in said displayed structure, designate said portion of the bit stream to be decoded. The invention thus makes it possible to obtain a "first" succinct representation of the coded structured document, making it possible to effectively designate the subpart to be accessed. In the event of successive accesses to several subparts of the document, this display can in particular be enhanced by the previous accesses in order to supply a more complete representation.

Correspondingly, the invention also relates to a device for coding a structured document as a bit stream, comprising the coding of hierarchized events composing the structured document as corresponding events coded by means of at least one encoding table, said at least one encoding table being updated when certain hierarchized events are coded, the device being characterized in that it comprises:

means for determining hierarchized events involved in the updating of the at least one encoding table;

means for associating marking information with the coded events corresponding to said determined hierarchized events.

Optionally, the coding device can comprise means relating to the characteristics of the coding method disclosed previously and having the same advantages.

Similarly, the invention also relates to a device for decoding a portion of a bit stream comprising coded events coding a structured document, the device comprising:

means for determining, in said bit stream, coded events associated with marking information;

means for constructing at least one decoding table by decoding solely, in said bit stream, determined coded events; and means of decoding said portion by means of the at least one constructed decoding table.

Optionally, the decoding device can comprise means relating to the characteristics of the decoding method disclosed above and having the same advantages.

The invention also relates to a binary data structure comprising binary codes corresponding to hierarchized events of a structured document coded by means of at least one encoding table, characterized in that it comprises, associated with each event in a plurality of coded events, marking information representing the involvement of the corresponding hierarchized event in an updating of the at least one encoding table during the coding of this event. In the same way as the above coding method, in particular by virtue of the marking information making it possible to quickly identify the coded events to be processed, such a structure simplifies the decoding processing operations by allowing the construction of decoding tables prior to access and to the decoding proper of the subpart of interest.

Seen from the decoding angle, this data structure relates to a binary data structure comprising binary codes corresponding to coded hierarchized events of a structured document and comprising, associated with each event of a plurality of coded events, marking information representing the need to update at least one decoding table, during the decoding of the corresponding coded event.

Optionally, these structures may contain technical characteristics relating to the steps of the method described above. In particular, in one embodiment, the structure comprises a first part formed from binary codes corresponding to the coded events and a second part comprising an indexing table of said coded events, said indexing table comprising, for the events of said plurality of coded events, information representing the position of the coded event in said data structure and said marking information.

According to one characteristic, the data structure comprises a header including said second part and a payload including said first part. As already indicated previously, the presence of the marking information in the header accelerates the processing for the construction of the decoding table and the decoding of the subparts of the document.

Intrinsically, the data structure concerns a binary data structure comprising binary codes corresponding to coded hierarchized events of a structured document, and items of marking information each associated with a coded event corresponding to a first occurrence of a hierarchized event in the structured document.

The invention also concerns a recording medium comprising one of the above data structures.

An information storage means, possibly totally or partially removable, able to be read by a computer system, comprises instructions for a computer program adapted to implement the processing method according to the invention when this program is loaded into and executed by the computer system.

A computer program able to be read by a microprocessor comprises portions of software code adapted to implement the processing method according to the invention when it is loaded into and executed by the microprocessor.

The information storage means and computer program have characteristics and advantages similar to the methods that they implement.

By virtue of the invention, it is possible to reconstruct an XML fragment from any position in a binary XML stream of the EXI type or similar. This effective reconstruction is obtained by the creation, during the EXI coding, of a structured document and by the storage of a set of information (index or indexing table) relating to the events that contribute to the updating of the EXI encoding tables, and their position in the bit stream.

The index is preferably stored in the bit stream containing the structured document coded in EXI format.

The various embodiments of the invention afford:
simpler and more rapid decoding of the XML fragments, allowing decoding on the fly;
various decoding modes: from the index, the index and the stream, or solely the stream;
the bit stream remains compatible with the EXI format;
indexing data are not mixed with the data of the document, which enables:
the decoder not implementing the invention to be able all the same to process the stream;
the decoders implementing the invention to be able to effectively code only a subpart of the bit stream;
a compromise between compression and granularity of the accesses by controlling the indexing depth;
adaptation of the marking of the contributing events according to the nature of the XML document;
having more precise marking for knowing on which dictionary of values, defined by EXI, an indexed event occurs (for example the dictionary of local names, global values, the local values, prefixes, URIs).

Other particularities and advantages of the invention will also emerge from the following description, illustrated by the accompanying drawings, in which:

BRIEF DESCRIPTION OF THE DRAWINGS

FIGS. 3A and 3B depict a functional representation of a coder according to the invention;

DETAILED DESCRIPTION

Figure 1:
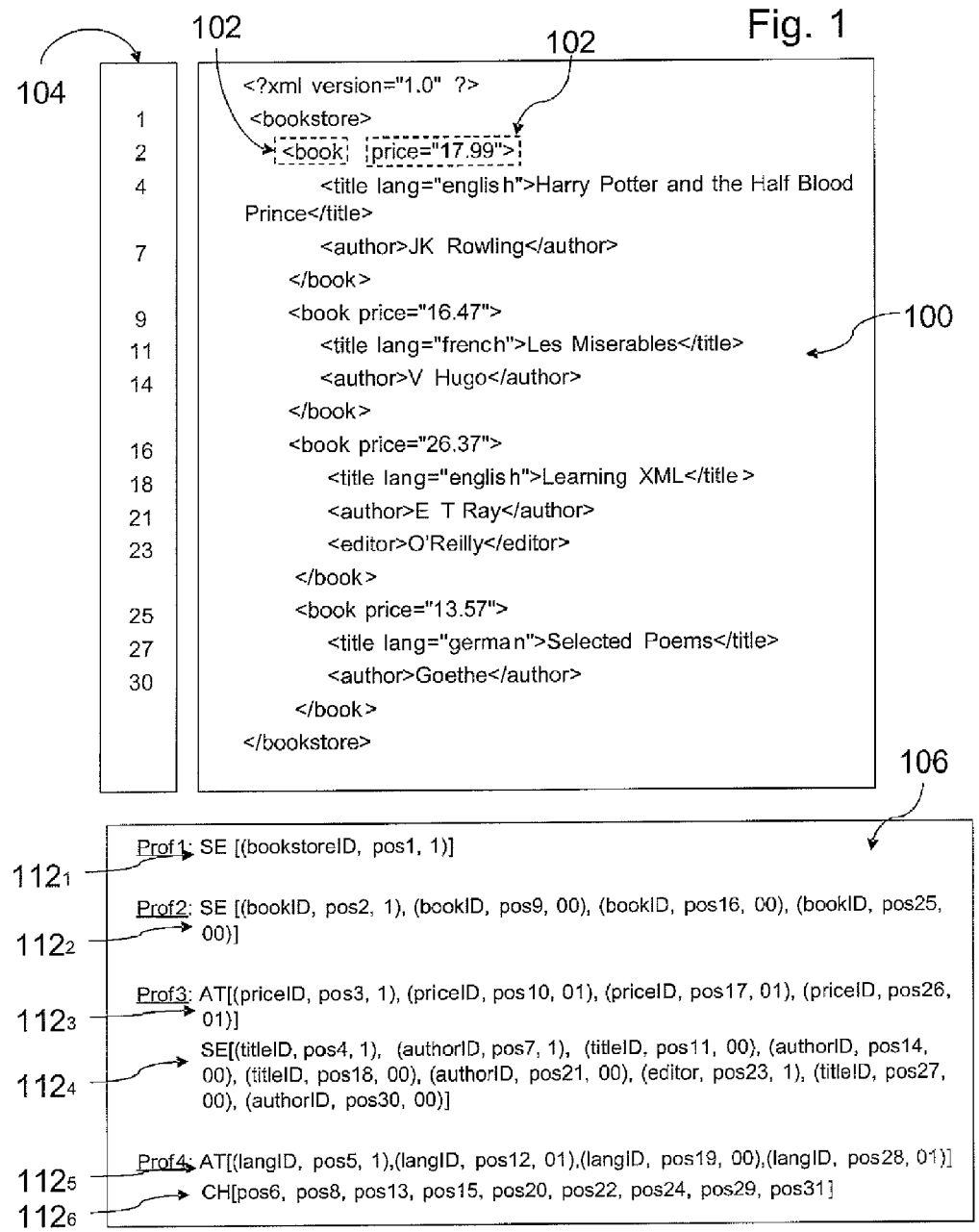
FIG. 1 depicts an example of a structured document and an indexing table established according to the present invention.

The invention is now illustrated by means of a first example of a structured document 100, here an XML document, as depicted in FIG. 1.

To simplify the explanations that follow, this example contains only events 102 of the "start of element" type (type SE to the EXI format), "end of element" type (type EE), attribute type (type AT) and character string type (type CH). Nevertheless, the invention applies to any event of a structured document.

A numbering of the positions of the XML events of the document 100 has been shown at 104, here the numbering being incremented by events in events. For example <book> constitutes the "start of element" event of index 2 and <price="17.99"> constitutes the attribute event of index 3.

Naturally the invention applies to other numberings, for example bit by bit, or line by line and word by word within each line.

The invention concerns in particular the coding of such a document 100, for example according to the EXI recommendation described above and by the use of grammars and dictionaries.

As will be seen subsequently, by virtue of the invention, an index 106 is obtained listing events 102 of the document 100, here all these events, identifiable by their position posi corresponding to the position of the indexed event number i at 104 in the encoded EXI stream.

This information is organized by depth (Depthi, corresponding to the depth i in the hierarchical structure of the elements of the document 100, assessed from the least depth element as far as the details of the document of maximum depth) and by type of event (SE, AT, CH), and contains:
either an identifier with a position posi and a marker indicating the contribution to the updating of at least one EXI grammar or dictionary. This is in particular the case with the events 102 of the attribute AT and start of element SE type,
or a position solely in the case of text nodes (CH).

This index 106 can be used for accessing the bit stream corresponding to the XML document 100 once coded, for example an EXI stream.

According to the invention, this index 106, which is communicated in the bit stream itself, makes it possible to accelerate the reconstruction by decoding of a subpart of the initial document 100.

Figure 2:
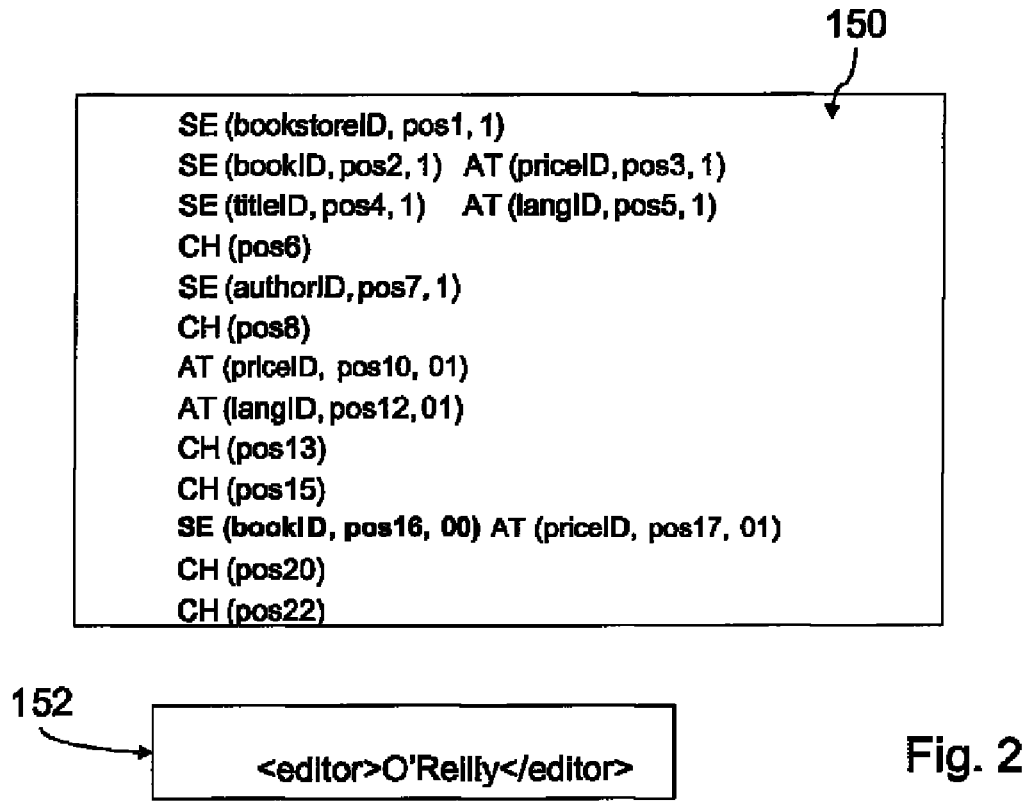
FIG. 2 illustrates the decoding according to the invention of a subpart of the document of FIG. 1.

For example, if it is wished to reconstruct the subpart commencing at position pos23, which corresponds to the start of element "editor", the decoder filters this index 106 received in order to obtain an index 150 specific to the position pos23, as illustrated in FIG. 2.

As will be seen subsequently, this index 150, referred to as the "position index", contains globally only the events contributing to the updating of the EXI grammars and dictionaries and preceding that (pos23) by means of which access is gained to the subpart that concerns us.

By means of this index 150, the decoder quickly runs through (solely by accessing the events of the index 150) the EXI bit stream received in order to update the dictionaries and grammars in order then to be able to correctly decode the element "editor" 152 at position 23, by means of the conventional decoding mechanisms.

The index 150 contains in particular the events corresponding to the changes in EXI grammar, generally the events that are directly parents of the one to which it is wished to access, even if they do not contribute to the updating of the encoding tables. Here the event SE(bookID, pos16, 00) which, as can be seen from the document 100, is not an event modifying the dictionaries and grammars.

Thus, in place of the thirty-one indexed events, only half need to be processed in order to reconstruct the fragment corresponding to the element "editor".

A description is now given of the operations of coding the XML document 100 and decoding the bit streams thus generated. These operations are in particular illustrated by means of the coding in accordance with the EXI recommendation.

Figure 3A:
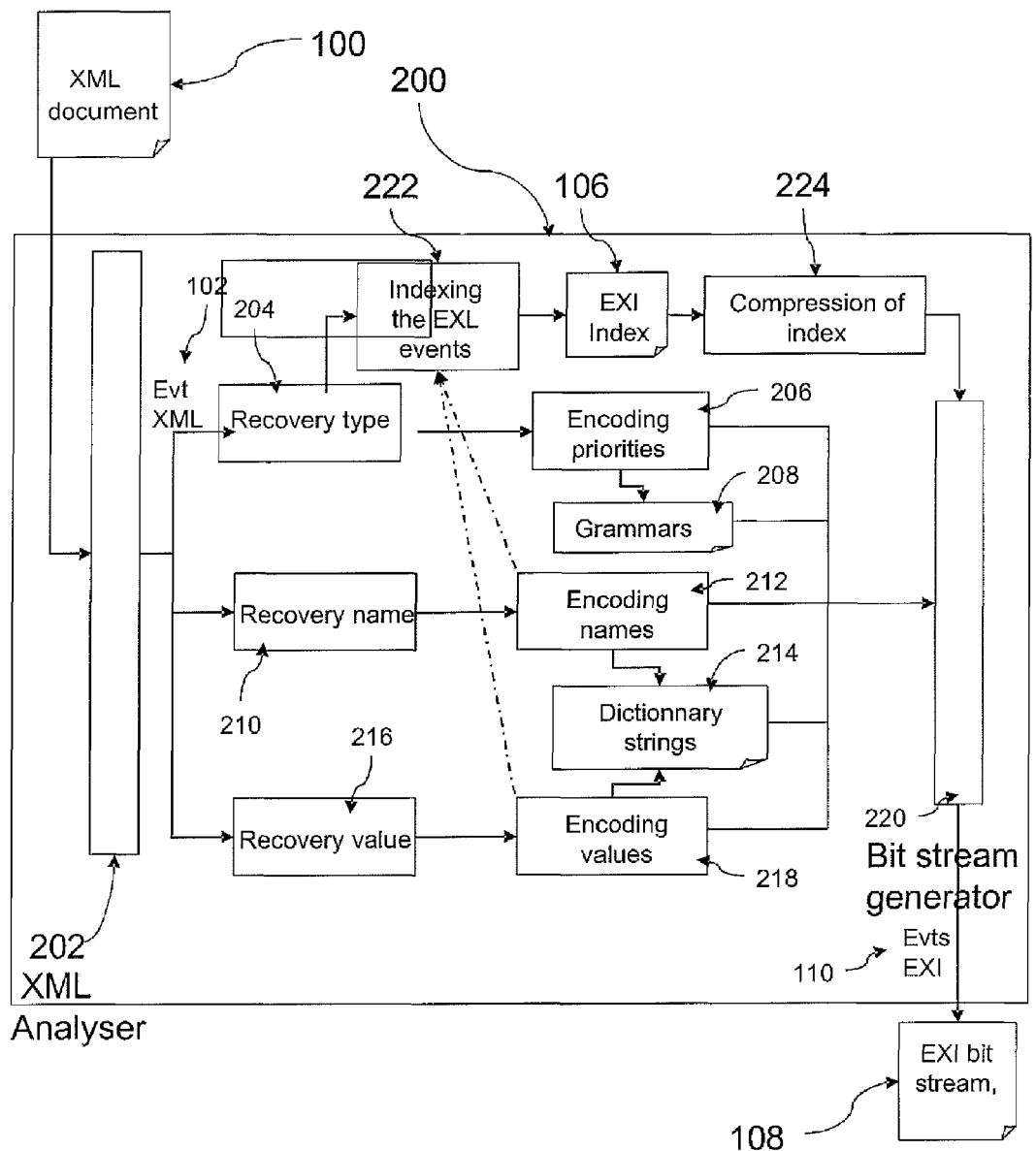

FIG. 3A depicts a coding device 200 for implementing the coding method according to the invention.

Conventionally, the coder 200 receives as an input an XML document 100 at an XML analyzer 202 extracting the XML events 102 one by one.

A module 204 recovers the types of event extracted and supplies a module 206 for managing the grammars 208 and encoding the priorities in these grammars.

At the same time, a module 210 recovers the name of the event, for example in the case of an attribute ("price" in the example of the event of index 3 of the document 100), which it supplies to a module 212 for encoding the event names. This module 212 performs this encoding by means of one or more dictionaries 214 of character strings.

Still at the same time, a module 216 recovers the values of the events (for example "17.99" in the example of the event of index 3 of document 100), which it passes to a module 218 for encoding the values also relying on dictionaries 214.

All this encoding information (priorities, name codes, value codes) are transmitted to the bit stream generator 220, which then generates the EXI bit stream 108 corresponding to the XML document 100. For the remainder of the description, all the binary coding data (in the stream 108) corresponding to an XML event 102 are denoted EXI event 110.

The coder 200 also comprises a module 222 for indexing the EXI coded events, supplied by the type recovery module 204, the name encoding module 212 and the value encoding module 218.

The indexing module 222 generates the EXI index 106, which is compressed by a compression module 224, before being supplied to the bit stream generator 220 for integration thereof in the bit stream 108.

Figure 4:
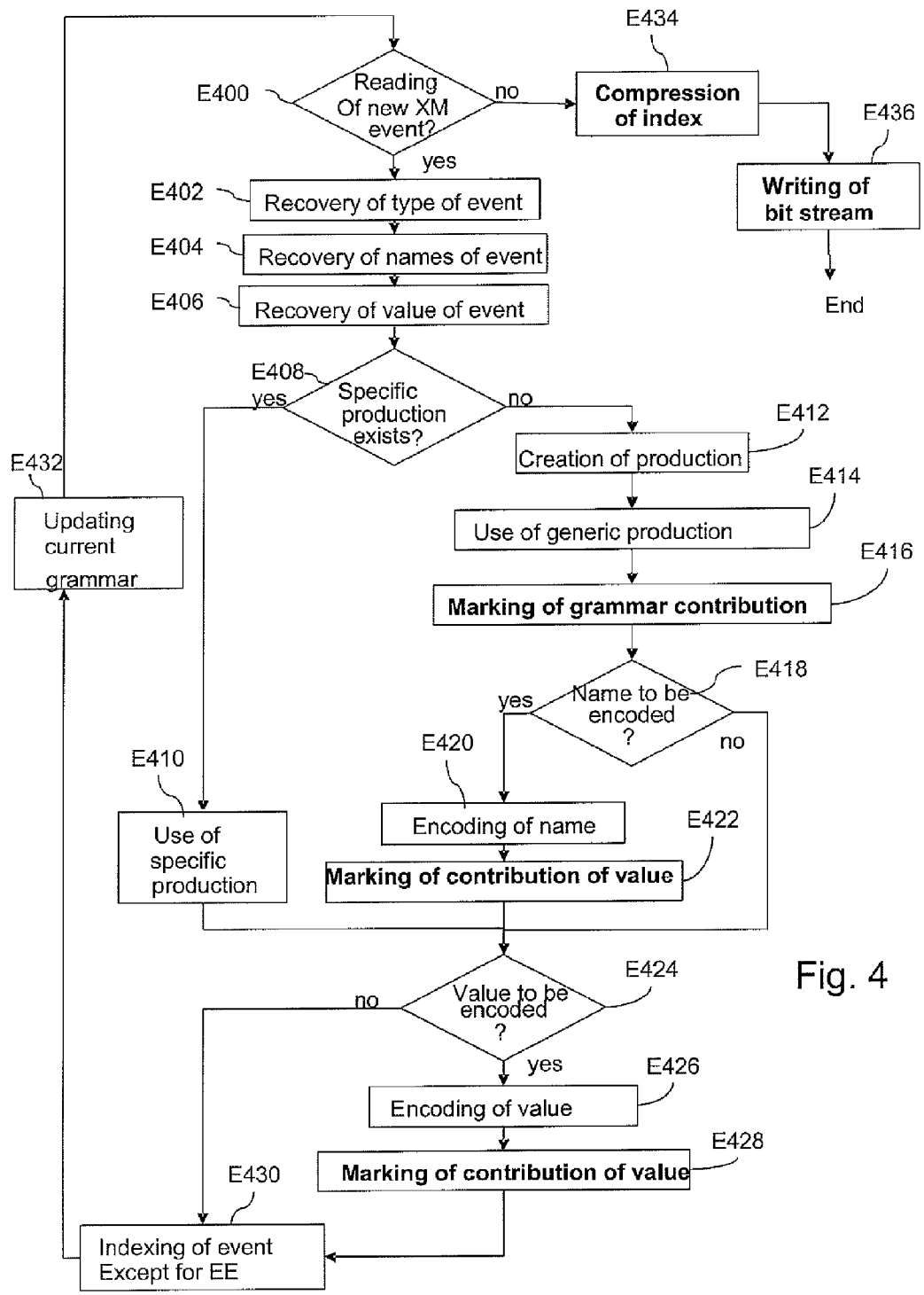
FIG. 4 is a flow diagram representing an example of coding steps according to the invention.

The encoding process is now described with reference to FIG. 4.

When an XML document 100 is supplied to the EXI coder 200, the latter runs through it according to a well known mode (SAX or pull model) which consists of extracting one by one the various items of information represented by XML events 102. It is the XML analyzer 202, or parser, which is responsible for this extraction during step E400.

Each XML event 102 extracted at step E400 carries information depending on its nature. The first of these items of information is its type recovered at step E402 by the type recovery module 202.

For the "start of element" and "end of element" events, as well as for the attributes, namespace prefix information and a local name may be present and are therefore recovered, during step E404, by the name recovery module 210.

For the attributes and text nodes, value information is present in the form of a character string. This is recovered where necessary, during step E406, by the value recovery module 216. For each new event 102 to be coded, the coder 202 checks, at step E408, whether it has a corresponding specific production in its current grammar 208.

If this test indicates that a specific production already exists, then this is used, in a conventional fashion, at step 410 to determine the priority code to be encoded in the bit stream 108.

If such a production does not already exist, this is created and inserted in the current grammar 208 during step E412. In addition, during this same step, if it is a case of a "start of element", a new grammar is created to represent this element and is inserted in the table of grammars 208.

In this case, step E414 is continued to, where the coder of priorities 206 uses the generic production of the current grammar in order to directly determine the binary code representing the type of information of the current XML event. The priority coder 206 is responsible for then transmitting it to the bit generator 220 for insertion in the EXI stream 108.

Next, at step E416, the current EXI event 110 is marked as contributing to the updating of the grammars. An example of marking is detailed below.

Following the marking, it is tested, at step E418, whether a name (recovered at step E404) is associated with the event 102. In the event of a positive test, this name is encoded during step E420 and written in the bit stream 108. Then the current EXI event 110 is marked at step E422 as contributing to the updating of the value dictionaries 214 if a new entry is added, on this occasion, to the dictionaries 214 (the case if the name has not already been encoded).

The following step E424 occurs following steps E410, E418 (if negative test) or E422 and consists of checking whether a value (recovered at step E406) is to be coded. This is the case for the events of type AT or CH.

If such is the case, the value coder 218 codes the recovered value at step E426 and writes it in the bit stream 108 and then at step E428 marks the current EXI event 110 as contributing to the updating of the value dictionaries 214 if a new entry is added, on this occasion, to the dictionaries 214 (the case if the value has not already been encoded).

The EXI event thus produced is then indexed in the index 106 at step E430, unless it is a case of an event of the EE type. This indexing is described below with reference to FIG. 5.

Following the indexing of the current EXI event, the updating of the current grammar 208 of the coder 200 is pursued at step E432 in order to prepare the coding of the following XML event 102 (for example change of grammar if a "start of element" event has just been processed).

Figure 6:
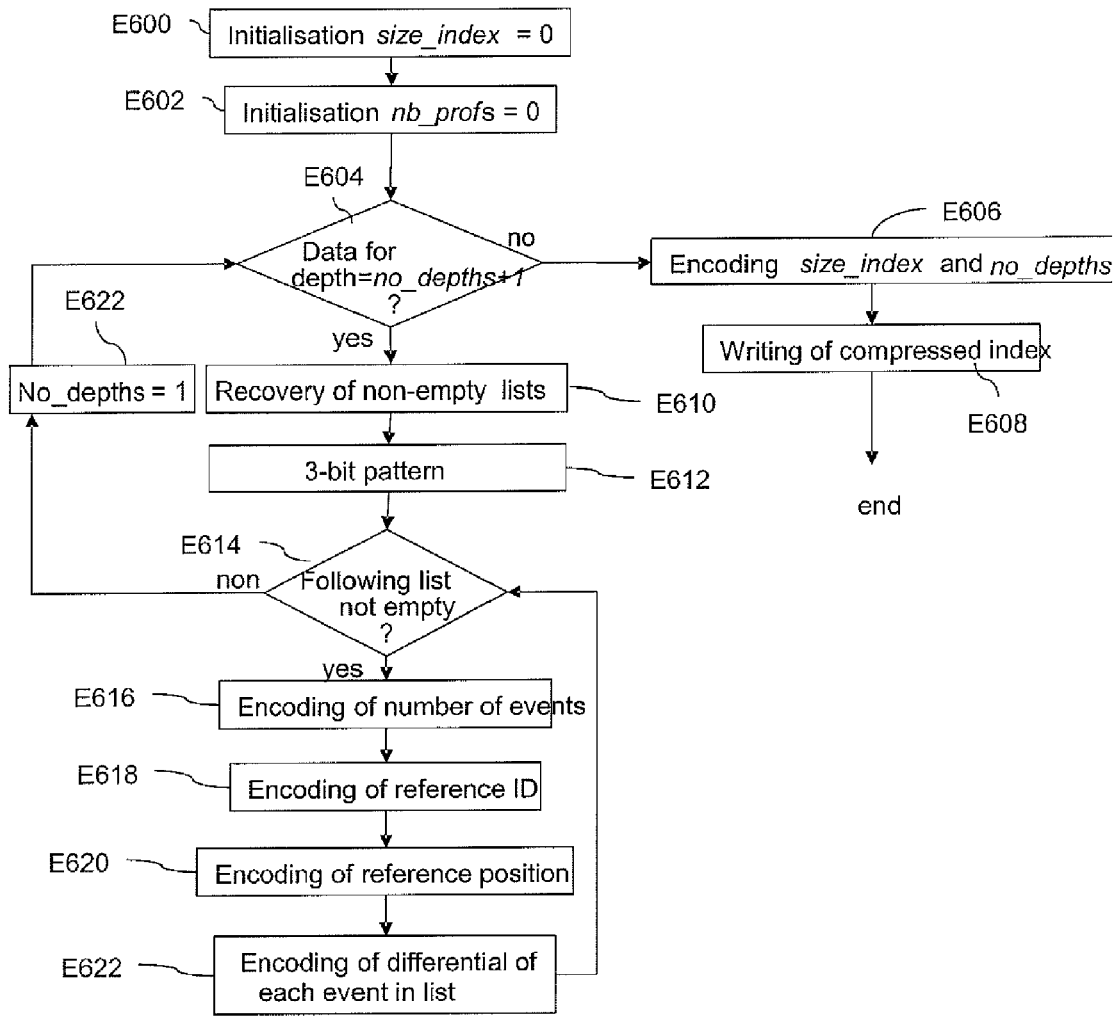
FIG. 6 illustrates the compression of an indexing table according to the invention during the decoding in FIG. 4.

If no further XML event 102 remains to be read (test E400 false), the index 106 produced throughout the encoding is compressed at step E434. This compression is described below with reference to FIG. 6.

Finally, the EXI bit stream 108 is generated at step E436 with in particular the index 106 and its size in number of bits inserted at the start of the EXI bit stream 106 in optional parts (header) of the stream in order not to compromise the decoding of this EXI bit stream 108 by a decoder not implementing the invention.

It should be noted that placing the index 106 at the start of the EXI stream 108 allows decoding of the coded document on the fly. The counterpart lies in an encoding which for its part cannot be carried out on the fly. This configuration is slightly detrimental in that a good number of scenarios consist of encoding the XML document 100 only once and running through and decoding the corresponding bit stream 108 a large number of times, possible by means of requests of the XPath or XQuery type.

The marking of the EXI events 110 mentioned in steps E416, E422 and E428 is now described.

Each XML event 102 encountered by the coder 200 is encoded as an EXI event 110 as described in the recommendation of the same name. Among these events, only the EXI events of SE, AT and CH type are indexed. The EE events corresponding to ends of element can be deduced by the decoder (for example, last event before the opening of a new event of the same or less depth).

Each event indexed by the module 222 of the EXI coder 200 is marked by a code of 1 to 2 bits that represents the contribution of this event with regard to the updating of the encoding tables, that is to say the various dictionaries 214 and grammars 208, according to the following configuration:

the binary code "1" means that the current event contributes to the updating of the grammars 208 and possibly the dictionaries of strings 214. This is for example the case with an EXI event of type SE corresponding to a "start of element" for which there yet exists neither an associated grammar nor an associated production in the current grammar. This is also the case with an EXI event of the AT type or CH type for which there yet exists no associated production in the current grammar;

the binary code "01" means that the event contributes only to the updating of the dictionaries of strings 214. In the case of an EXI event of the "start of element" type SE, this is not possible since a new element will give rise to the creation of an associated grammar as well as a corresponding production in the current grammar. In the case of an EXI event of the attribute type AT called pref:name, this means that a production AT(pref:name) already exists in the current grammar but that the value of this attribute is not yet indexed. Ditto in the case of an EXI event CH corresponding to a text node;

the binary code "00" means that the event does not contribute to the updating of any of the dictionaries 214 and grammars 208. For example, in the case of an EXI event of the "start of element" type SE, this means that its name (local name+namespace) has already been encountered and indexed and that a grammar StartTag-Content name describing its content already exists as well as a productions SE(name) in the current grammar. In the case of an EXI event of the attribute type AT, this code 00 means that its name (local name+namespace) and its value have already been encountered and indexed and that a production AT(name) already exists in the current grammar. For an EXI event corresponding to a text node CH, this means that a production CH already exists in the current grammar and that the value corresponding to this text node is already indexed in a dictionary of strings 214.

During steps E416, E422 and E428, the marking can consist of updating a current indicator with one of the above codes. The indexing of the event during step E430 then takes this indicator again in order to insert the corresponding information in the index 106, as will be see subsequently.

Figure 5:
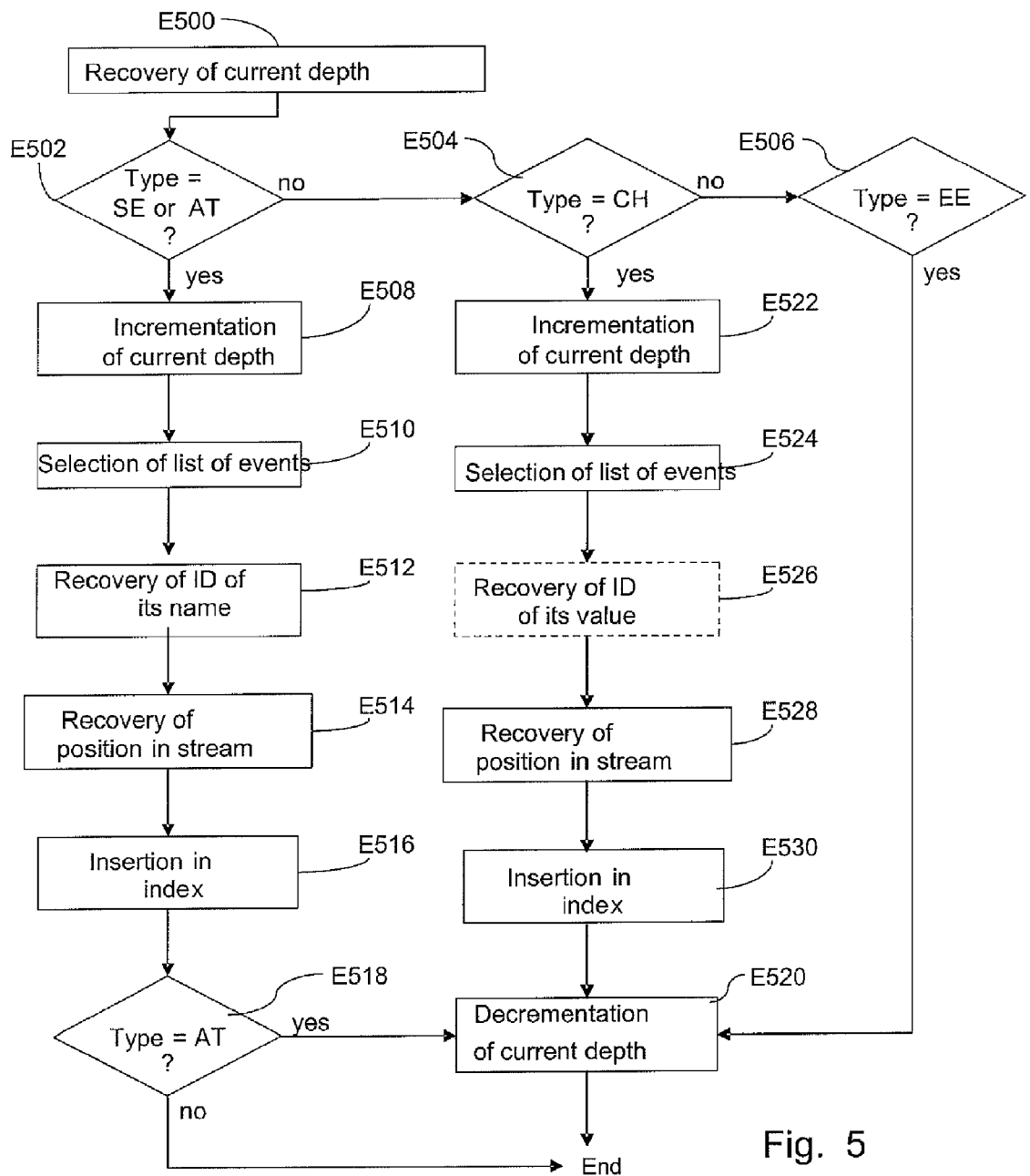
FIG. 5 depicts, in the form of a flow diagram, steps of indexing an EXI event during the decoding in FIG. 4.

A description is now given, with reference to FIG. 5, of the indexing of the EXI events 100 by addition in the index 106, performed in particular during step E430.

At step E500, the entity responsible for the indexing within the coder 200, the indexer 222, commences by recovering the current depth in the XML document 100. This depth is maintained by the indexer 222 throughout the running through of the XML document 100, by means of a counter that is incremented or decremented according to the events encountered.

The following step consists, for the indexer 222, of verifying the type of current EXI event 110 by means of tests E502, E504 and E506, making it possible here to filter the events of type SE, AT and CH.

If the current EXI event 110 is of the SE or AT type, test E502 is true. The indexer 222 then increments the current depth at step E508. Then, for this new depth, it selects at step E510 the list in the index 106 where the current EXI event 110 is to be inserted.

This is because, for a given depth in the corresponding hierarchical structure of the XML document 100, the EXI events 110 are organised by type as illustrated in FIG. 1. In this figure, six lists $112_1$ to $112_6$ can be seen. The list $112_i$ corresponding to the current depth and to the type (SE or AT) of the current EXI event 110 is therefore selected (it is created if necessary).

Once this list $112_i$ has been recovered, the indexer 222 recovers, at step E512, the identifier for representing the name associated with the current EXI event 110. This identifier may in particular correspond to the coding value of the name or to an associated unique key used in the dictionaries 214.

At step E514, the indexer 222 recovers, from the bit generator 220, the position posi defining the start of the content of the current EXI event 110 in the bit stream.

Step E516 is continued to, where the indexer 222 inserts, in the list $112_i$ recovered at step E510, this new EXI event 110 with its position posi, the identifier recovered at E512 (for example the identifier bookID for the list $112_2$) and its contribution code as defined previously and determined during marking steps E416, E422 and E428.

Finally, if the current EXI event 110 is of the type AT (test 518 true), the current depth is decremented by "1" at step E520. Otherwise its value remains unchanged and the indexing of the current EXI event 110 ends.

If the current EXI event 110 is of the type CH, the test E502 is false and the test E504 is true. The indexer 222 then increments the current depth by 1 during step E522.

It next selects, at step E524, the list $112_i$ of EXI events of type CH at this new depth (it creates it if necessary).

Optionally, the indexer 222 can recover the identifier of the value of this EXI event 110 during a step E526 with a view to associating it with the indexed EXI event. By default, this value is not recovered and only the position posi in the bit stream 108 corresponding to the start of this EXI event 110 is recovered at step E528.

Then at step E530 the current EXI event 110 is inserted in the list $112_i$. Here only its position posi in the list is inserted (see list $112_6$ in FIG. 8 for example).

According to a variant, the indexer 222 can associate, with this EXI event 110 of the type CH, the identifier recovered at E526 (ID, posi) and possibly its contribution code (ID, posi, code) determined during steps E416, E422 and E428. However, the probability of contribution of the EXI events 110 of type CH to the updating of dictionaries of values 214 being very high, it is not indexed in order not to unnecessarily increase the size of the index 106. Likewise the probability of having two identical values for two EXI events of type CH being low, the identifier is therefore not associated with the indexed EXI event for the same reasons.

If the current EXI event 110 is of the type EE, tests E502 and E504 are false, and text E506 is true. The step E520 of decrementing the current depth is passed to directly.

This indexing step E430 described by FIG. 5 is performed for each EXI event 110 of type SE, AT or CH encountered while the XML analyzer 202 is running through the XML document 100 and leads to the construction of the index 106. Before being integrated in the EXI bit stream 108 by the bit generator 220, this index 106 is compressed (step E434) as illustrated below with reference to FIG. 6.

As mentioned previously, the binary coding techniques aim to provide a compact representation of the XML document 100. The high compression ratio of the EXI coder 200 is obtained to the detriment of accessibility in this EXI bit stream 108.

The inclusion of the index 106 in the bit stream 108 increases the size of the latter. Through the step of compressing the index, it is thus sought to provide a compact representation of the index 106 in order to keep a satisfactory compression ratio. This operation is performed by the index compression module 224.

It will be noted, in particular in the example in FIG. 1, that the information contained in the index 106 is redundant and that these redundancies can be exploited in order to represent the index in a more compact fashion. The index 106 is in particular organized, as mentioned above, according to the depth in the structure of the document, and then by type of EXI event (between one and three lists per depth level, corresponding to the types SE, AT and CH). The index compressor 224 relies on these two organization levels for compressing the index 106.

Once again with reference to FIG. 6, at step E600, a parameter size_index is initialized, which will contain the size of the index 106 expressed in number of bits, as this index is progressively constructed. The starting value is 0.

At step E602, a parameter No_depths representing the number of depth levels is likewise initialized to 0.

As will be seen subsequently, these two parameters are incremented throughout the running through of the index 106 and then inserted at the very beginning of the compressed index 106 in order to enable it to be decoded subsequently. In general terms, the parameter size_index is incremented, at each coding of a value, by the number of bits necessary for the representation of the value thus coded.

The following step E604 consists, for the index compressor 224, of checking whether data of the index are available at the next depth No_depths+1.

If such is not the case (output NO), the index 106 has been entirely run through, and its size size_index and its number of depth levels No_depths are encoded at step E606. This encoding corresponds in particular to the encoding of a non-signed integer as described in the EXI specification.

At step E608, these two values are inserted at the start of the compressed index, by the bit generator 220, which closes the step 516 of compressing the index 106.

The encoded size size_index takes into account, in addition to the number of bits of the content proper of the compressed index, the number of bits necessary for the representation of this size size_index itself and the number of depth levels No_depths. This enables the decoder, used afterwards, to deduce the indexed positions from the global positions in the EXI bit stream 108 received by a simple difference between these absolute positions and the size of the index.

Figure 7:
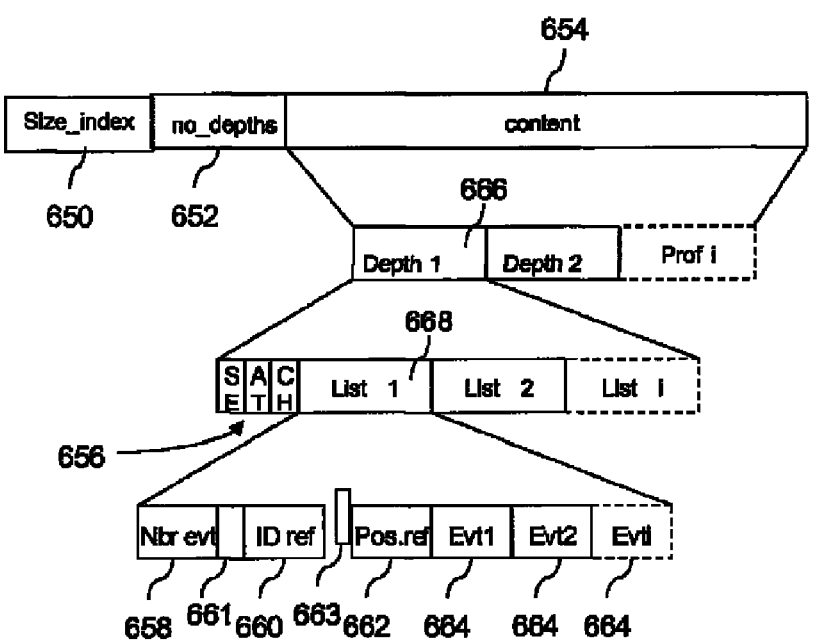
FIG. 7 depicts an example of a compressed indexing table structure.

FIG. 7 depicts the structure of the compressed index at the end of step E608. The size 650 size_index constitutes the first bits of the compressed index followed by the number of depths 652 No_depths, and finally the content 654 of the compressed index 106 as described below.

In the case where data remain for the following depth (YES at test E604), the index compressor 224 recovers, at step E610, the lists $112_i$ of non-empty EXI events for this depth.

The compressor 224 then defines, at step E612, a pattern 656 in three bits, each bit indicating respectively the presence of EXI events 110 indexed in the lists $112_i$ of EXI events recovered at E610. The three bits are associated respectively with the EXI events of type SE, AT and CH, a bit set to "1" indicating that a list $112_i$ of the associated type is not empty. On account of these three bits, the size of the index size_index is incremented accordingly.

Next, using step E614, the index compressor 224 iterates on the non-empty lists $112_i$ recovered at step E610, and commences by encoding, at step E616, the number 658 of EXI events 110 encoded in the current list. The coding used is the coding of a non-signed integer as defined by the EXI specification. The number of bits necessary for this encoding of the number 658 is added to the size of the index size_index.

At step E618, the compressor 224 recovers the name identifiers (for example "bookID", except in the case of the list corresponding to the events of type CH when it does not contain such identifiers) and determines the most present identifier as the reference identifier. In example 106 in FIG. 1, at depth 2, the identifier "bookID" is the most frequent. This identifier is then coded as a non-signed integer 660. The size of the index size_index is incremented by as many bits.

At step E620, the first position in the current list $112_i$ is coded as a non-signed integer 662. In the above example, "pos2" is encoded.

Next, during a step E622, each EXI event 110 of the current list $112_i$ is coded in a bit word 664 comprising the identifier, the position and the marker for the EXI events of type SE and A T and the position only for the EXI events of type CH (possibly with identifier and/marker according to the embodiment chosen). Each identifier and each position of an EXI event 110 are coded by differences with the reference values determined at steps E618 and E620. Then a fixed number of bits are used for representing the maximum differences between a value and its reference value. This number of bits is indicated a 661 for the identifiers and at 663 for the positions. Each contribution marker is also coded during this step E622. In addition size_index is incremented by as many bits used for coding all the EXI events 110 in the current list $112_i$.

The index compressor 224 next passes to a following list during step E614 and once again iterates steps E616 to E622 for this list.

If no further list is to be processed for this current depth (test E614 false), the number of depth levels No_depths is incremented by 1 and the compressor 224 checks again, at step E604, whether data are to be encoded for the following depth. When this is no longer the case, compression of the index ends.

In a particular embodiment, the test of step E604 can contain a maximum depth beyond which it is not wished to index in order to control the size of the compressed index. However, in this case, the EXI events 110 marked as contributors (marking "1" or "01") beyond this maximum depth will have to be indexed, only the non-contributors (marking "00") situated beyond this maximum depth will be able to be removed from the indexing.

In FIG. 7, the structure of the compressed index is found again, where the content 654 is composed of portions 666 each corresponding to a depth level (iterations during step E604). Each portion 666 is composed of the pattern 656 of three bits specifying the lists $112_i$ present, and several subparts 668 each associated with a coding of a list $112_i$.

Thus each subpart 668 is composed successively of the number 658 of events in the list, the reference identifier 660, the reference position 662 and the binary words 664 relating to the coding of each of the EXI events 110 in the list.

The decoding of part of the bit stream 108 generated at the end of step E436 is now described. The decoding results in an XML fragment.

Figure 8:
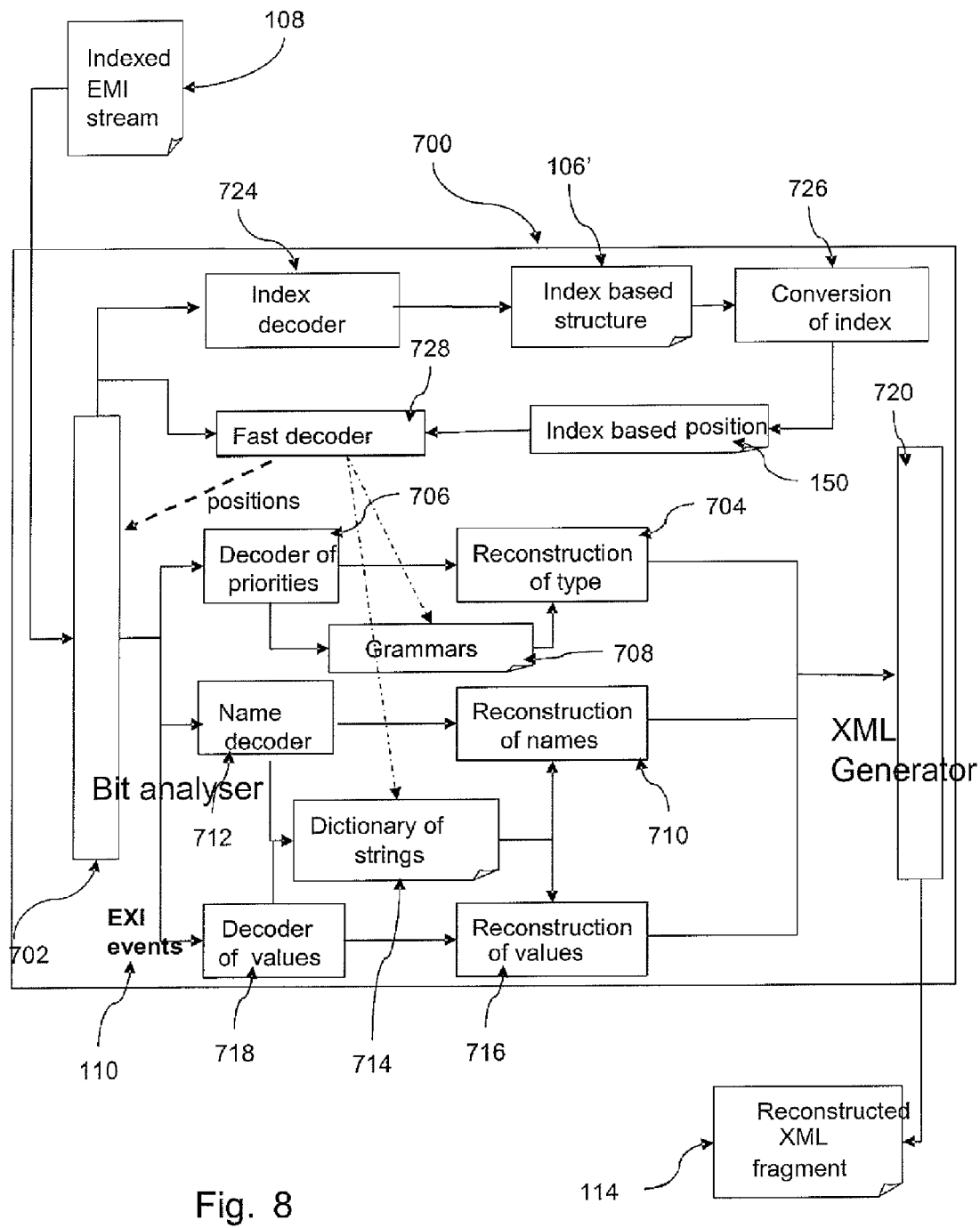
FIG. 8 is a functional representation of a decoder according to the invention.

FIG. 8 depicts a decoder 700 according to the invention receiving as an input the indexed EXI bit stream 108 and supplying as an output the XML fragment 114.

The decoder 700 is symmetrical with the coder 200 with, in a conventional part, a parser 702 supplying the compressed EXI events 110 to a priority decoder 706 itself coupled to a reconstructor of the type 704 both capable, by means of decoding grammars 708, of determining the type of XML event decoded; to a name decoder 712 coupled to a name reconstructor 710 both capable, by means of dictionaries of strings 714, of reestablishing the name of the decoded XML event; and a value decoder 718 coupled to a value reconstructor which, together and by means of the dictionaries 714, re-establish the values of the decoded XML events.

These various modules update the decoding tables during a conventional decoding.

All this type, name and value information is supplied to the XML generator 720, which reconstructs the XML fragment 114.

The parser 702 is capable of recovering words of different lengths in the stream 108 and advancing in the latter while ignoring a given number of bits. The parser is then controlled by the various modules 706, 712, 718, 724 and 728 according to their respective requirements as described below.

The decoder 700 also comprises an index decoder 724 able to supply an index 106', a priori identical to the encoded index 106, an index converter 726 that, from this index 106', will generate an index 150 specific to a position posi in the document, and a fast decoder 728 that will access the stream 108 solely for the events of the index 150 so as to reconstitute the grammars 708 and dictionary 714 that will serve for the reconstruction of the XML fragment 114 in a conventional fashion.

Figure 9:
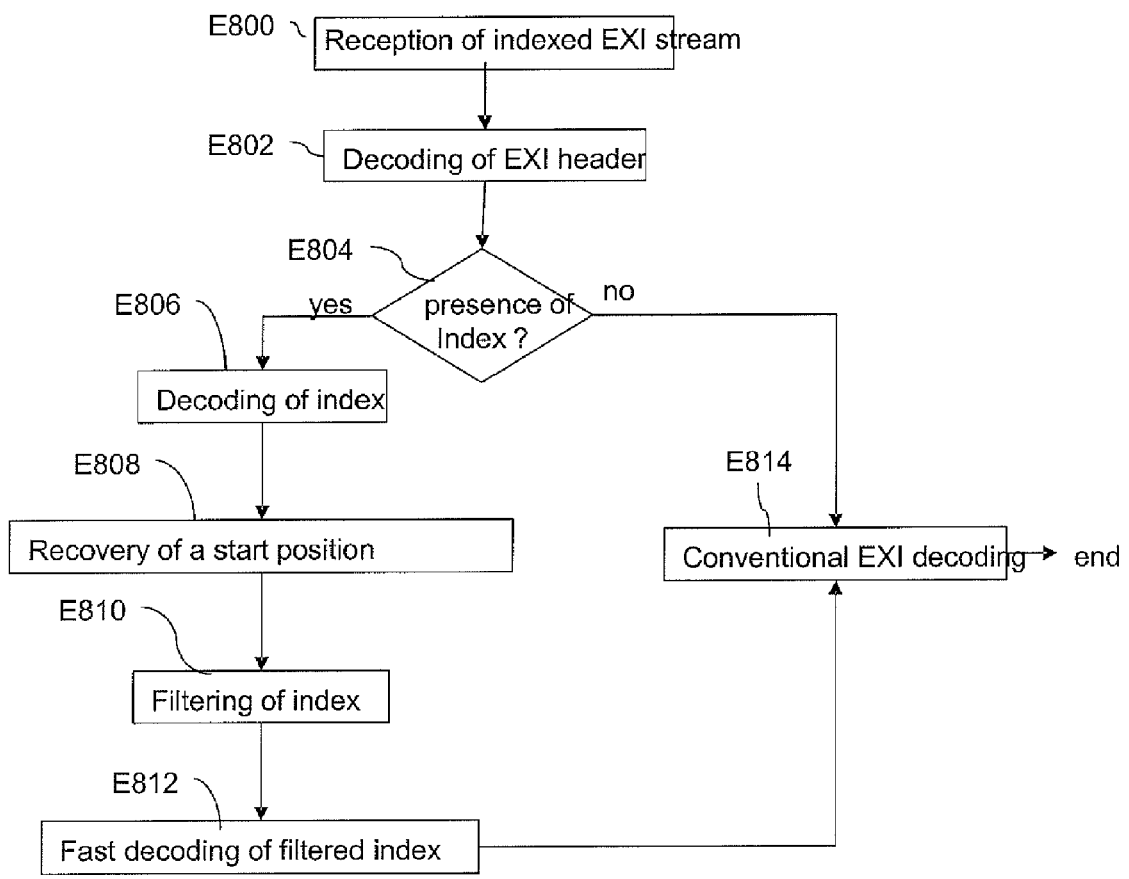
FIG. 9 is a flow diagram depicting an example of decoding steps according to the invention.

The decoding steps are illustrated with reference to FIG. 9.

As is clear from above, the binary EXI stream 108 is organized so that the index constructed and compressed is situated in the optional parts at the start of the stream (the header).

After reception of the bit stream 108 by the decoder at step E800, the EXI header is decoded at step E802 according to conventional mechanisms.

At step E804, the decoder 700 detects whether, in this header, there are data corresponding to an index.

In the case of a negative response, it proceeds with a conventional decoding (E814) of the coded data, using in particular the conventional construction of the encoding tables as the decoding progresses.

In the case of a positive response, the index decoder 724 decodes the compressed EXI index at step E806 so as to obtain an index 106' which, unless there is a transmission or decoding error (normally), is similar in content to the index 106.

For this purpose, the index decoder 724 applies the algorithm that is the reverse of the compression one described above in relation to FIG. 6. It decodes the size data 650 and number-of-depths data 652 and then iterates on these depths (test E604). For each depth level, the pattern 656 of three bits calculated at E612 indicates the non-empty lists $112_i$. For each non-empty list, the index decoder 724 recovers the number 658 of events coded during step E616, the reference values 660, 662 coded at steps E618 and E620, and the iterates on the EXI events 110 present in the list $112_i$ in order to recover their position and where applicable their name identifier and their contribution marker (decoding of the binary words 664). The result thus obtained is the global index 106'.

By virtue of the invention, the EXI decoder 700 is now ready to reconstruct a portion of the XML document 100 from any position posi corresponding to an indexed EXI event.

At the end of this step E806, the EXI decoder 700 is in a position to offer a preliminary display (on a computer screen for example) of the structure of the XML document 100 by means of the depth level information recovered, plus possibly the name of the first element and its first child commencing for example with the decoding of the first EXI events 110 of the stream 108. Only the nodes having EXI events 110 in the index 106' are displayed.

The child elements not yet decoded are displayed for example with a symbol "??" in place of their name. Clicking on one of the named or unknown nodes, via the graphical interface depicting the preliminary display of the document, makes it possible to recover an indexed node and therefore its position in the indexed EXI stream 108 and to indicate to the decoder 700 a starting position during step E808.

Once the fragment start position has been decoded, the index 106' is filtered during step E810 in order to obtain a reduced or filtered index 150 specific to this start position. This index 150 preferably corresponds to the minimum subset of EXI events 110 to be processed in order to reach the start position with the various dictionaries 714 and grammars 708 configured in the appropriate state.

For this purpose, the converter 726 runs through the global index 106' according to the increasing positions of the EXI events indexed.

Figure 10:
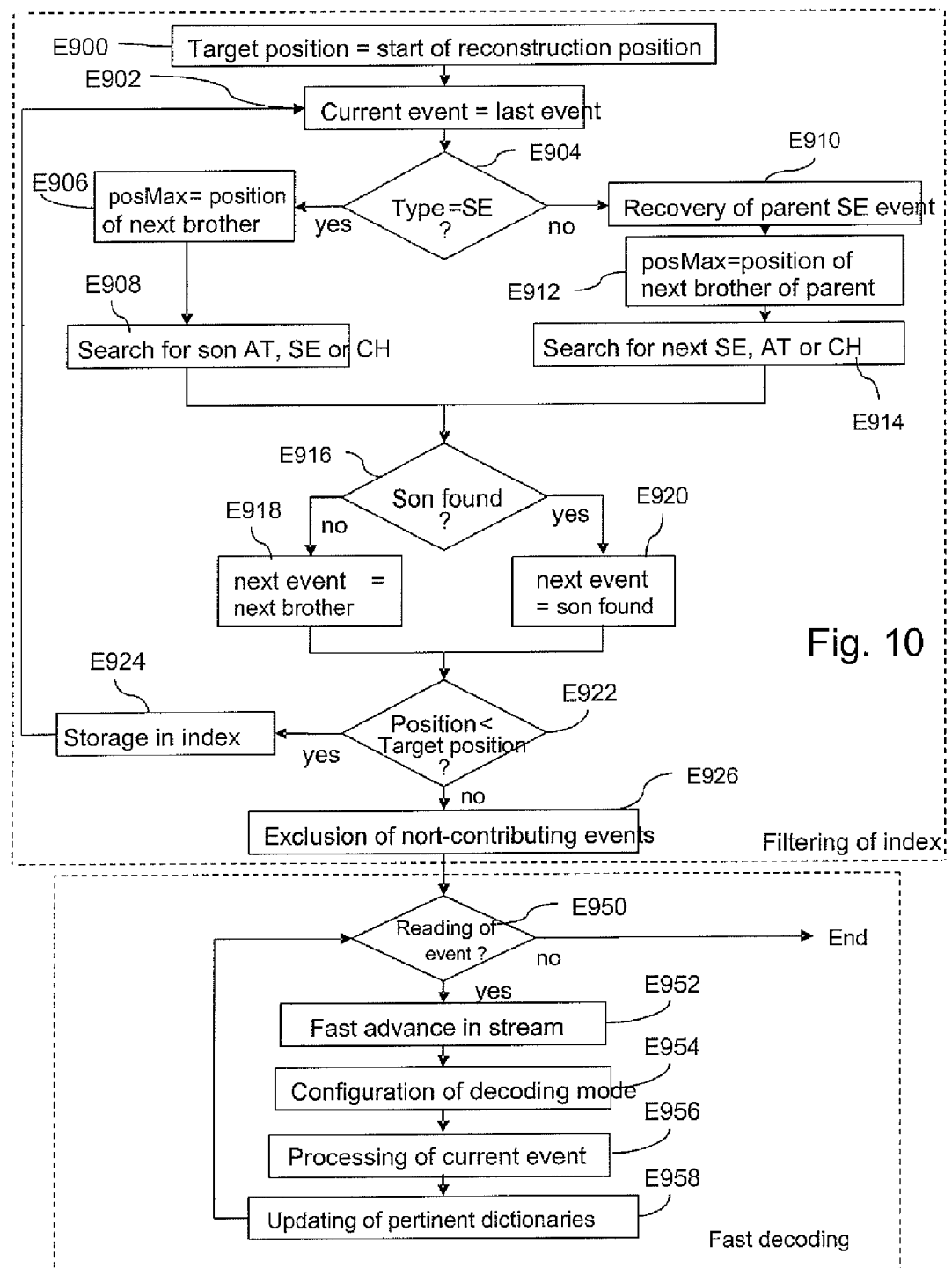
FIG. 10 depicts, in the form of a flow diagram, steps of filtering the indexing table received and of rapid decoding during the global decoding process in FIG. 4.

With reference to FIG. 10, the converter during step E900 initializes its target position (the position of the indexed EXI event to be reached) with the value recovered at E808.

At step E902, it also positions the current event on the last event processed (the first in the list $112_1$ of EXI events of type SE at depth 1 at starting) and, as the current depth, keeps the depth of the current event.

At step E904, it tests whether it is a case of an EXI event of the SE type.

If so, the converter 726 initializes, at step E906, a value posMax with the position of the brother (the next SE in the list) of the current event if such exists, otherwise with the brother of its parent, until an event SE is found or until the end of the index. posMax thus defines a maximum position beyond which any indexed EXI event cannot be considered to be a child of the current EXI event.

This position is used at step E908 in order to find the next child of the current EXI event of type SE: the converter 726 runs through the lists $112_i$ of depth +1 with respect to the current depth, from the last EXI event (current event) in each of these lists. It keeps among the pretenders AT, SE, CH the one whose position is the lowest whilst remaining lower than posMax. It may also limit its travel as far as posMax.

In the negative (test E904 false), it is a case of an EXI event of type AT or CH. The converter 726 then recovers, during step E910, the EXI event of type SE that is the parent of the current event in the list of events of type SE at the previous depth.

Then, at step E912, it recovers its brother if such exists, otherwise the brother of its parent, until an event SE is found or until the end of the index. In this way posMax is obtained.

At step E914, it then seeks the next EXI event, which may be of the SE, AT or CH type.

For an EXI event of the AT type, the next indexed EXI event may be either another EXI event of the AT type or an EXI type event of the CH type, or an EXI event of the SE type at the same depth or an EXI event of the SE type at the previous depth. The indexed EXI event adopted is, as for step E908, the one having the lowest position between the position of the current event and posMax.

For an EXI event of the CH type, the search is less complex since it is not possible to have an EXI event of the AT type. The converter 726 therefore limits itself to seeking an event of the SE type at the same depth or at the previous depth and, if such exists, keeps the one whose position is between the position of the current event and posMax.

At step E916, it is checked whether a child event has been found during step E908 or whether a next event has been found during step E914, according to circumstances.

In the negative, the converter 726 chooses, at step E918, as the next event, the brother event found respectively at steps E906 and E912.

In the affirmative at test E916, the next event becomes, at step E920, the event found during steps E908 or E914.

Following steps E918 and E920, the position of the next event is compared with the target position at step E922.

If this position is strictly less than the target position, then the next event is inserted in the filtered index 150 during step E924. Then this next event becomes the current event at step E902. The converter 726 then repeats the previous processing operations until the target position or the end of the global index 106' is reached.

It should be noted here that the invention is compatible with access to the XML document 100 in its entirety, the target position being fixed at the start of the document.

Once all the EXI events preceding the target position have thus been processed, a second pass occurs, at step E926, in order to take out of the filtered index 150 the EXI events whose contribution marker indicates that they are not involved in the updating (marker="00") of the dictionaries 714 and grammars 708. However, the EXI events 110 of type SE that are ancestors of the EXI event to be reconstructed are kept even if they do not contribute to these updates, in order to ensure correct stacking of the grammars 708. This is because the detection of an event of the SE type generally leads to the loading of a new grammar.

The index 150 shown in FIG. 2 illustrates in particular the application of this algorithm to the index 106 in FIG. 1, with a starting position equal to pos23. This second pass E926 makes it possible to eliminate the elements "book" and their content, except for the direct parent of the element "editor" that it is wished to reconstruct (SE(BookID, . . . SE(BookID, pos16,00)).

Returning to FIG. 9, once the index 150 based on the target position is obtained, the decoder 700 is ready to start its fast decoding phase, during step E812, which will configure it (and therefore construct the decoding tables of the grammar 708 and dictionary 714 type) with a view to reconstruction of the XML fragment 114 during step E814.

This fast decoding E812 is in particular illustrated by the bottom of FIG. 10 and is carried out by the fast decoder 728.

The latter runs through the list of EXI events of the index 150 and if necessary navigates in the bit stream 108 by means of the parser 702 in order to recover any missing information. The purpose of the fast decoder is to process the contributing EXI events (marking at "1" or "01") and to update the grammars 708 and dictionaries 714 as far as the required reconstruction position (the target position) recovered during step E808.

The EXI events indexed according to their position are read at step E950.

If no further event is available, it is the end of the fast decoding and the reconstruction step E814 is passed to.

For any EXI event read from the index 150 during step E950 (output YES of the latter), the fast decoder 728, during step E952, indicates to the parser 702 to skip to the position given by the position of the current EXI event.

At step E954, the fast decoder uses the contribution marker associated with the current EXI event in order to be configured in the mode most suited to a fast processing of the following EXI events.

If the marking encountered is equal to "1", indicating a contribution of the current event to the updating of the various dictionaries 714 and grammars 708, the fast decoder prepares to update these various decoding tables (by inserting a new value in the dictionary and/or a new production in a grammar, or even modifying the priorities of the productions) and to if necessary change grammar.

If the marker indicates an updating of the dictionaries of values only (marking equal to "01"), the fast decoder does not bother with the updating of the grammars 708 but only the dictionaries of values.

Finally, if it is a case of a marking equal to "00", that is to say indicating a non-contribution, there is no need for the fast decoder to update the grammars 708 and dictionaries of values 714. In the latter case, corresponding systematically to an EXI event of type SE, it must just consider, as the current grammar, the grammar associated with this EXI event of type SE (that is to say change grammar).

Step E956 is continued to, where the fast decoder 728 processes the current EXI event by decoding from the EXI bit stream 108:
   the data relating to its name (case AT or SE) if this has not already been encountered; and
   the data relating to a value (case AT or CH).

The data thus decoded are next used, during step 958, to update the dictionaries or grammars to which the current decoding mode relates (end of step E954).

Then the fast decoder 728 processes the next EXI event indexed in the filtered index 150, until the last one (test E950 false).

The EXI decoder is next ready to reconstruct the required XML fragment 114 (step E807) by a conventional decoding from the access position provided at step E808.

However, it keeps the initial depth (the depth corresponding to the EXI or XML event from which access is made) before this conventional decoding in order to know when it must stop. This end of decoding corresponds to the decoding of an EXI event of the EE type with a depth less than or equal to the initial depth.

Figure 11:
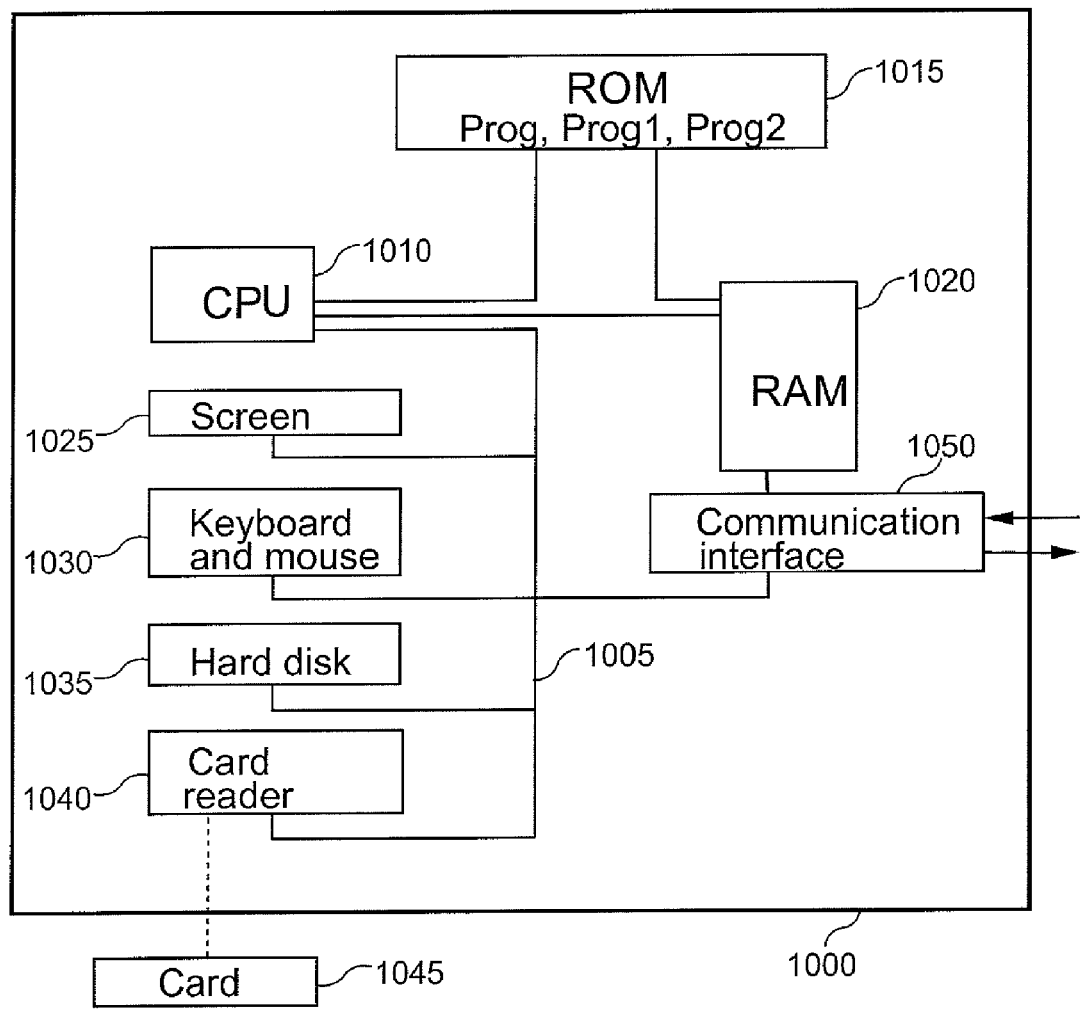
FIG. 11 shows a particular hardware configuration of an information processing device suitable for implementing the method according to the invention.

With reference to FIG. 11, a description is now given by way of example of a particular hardware configuration of an information processing device able to implement the method according to the invention.

An information processing device implementing the invention is for example a microcomputer 1000, a workstation, a personal assistant, or a mobile telephone connected to various peripherals. According to yet another embodiment of the invention, the information processing device is in the form of a photographic apparatus provided with a communication interface for allowing connection to a network.

The peripherals connected to the information processing device comprise for example a digital camera, or a scanner or any other image or XML document acquisition or storage means, connected to an input/output card (not shown) and supplying multimedia data to the information processing device.

The device 1000 comprises a communication bus 1005 to which there are connected:
   a central processing unit CPU 1010 in the form for example of a microprocessor;
   a read only memory 1015 in which the programs whose execution enable the method according to the invention can be contained;
   a random access memory 1020 which, after the powering up of the device 1000, contains the executable code of the programs of the invention as well as registers adapted to record variables and parameters necessary for implementing the invention;
   a screen 1025 for displaying data and/or serving as a graphical interface with the user, who can thus interact with the programs of the invention, by means of a keyboard 1030 or any other means such as a pointing device, such as for example a mouse or optical pen;

a hard disk 1035 or storage memory, such as a memory of the compact flash type, able to contain the programs of the invention as well as data used or produced during the implementation of the invention;

a card reader 1040, or other reader for a removable data carrier, adapted to receive a memory card 1045 and to read/write thereon data processed or to be processed in accordance with the invention; and a communication interface 1050 connected to a telecommunication network, the interface 1050 being able to transmit and receive data.

The communication bus 1005 allows communication and interoperability between the various elements included in the device 1000 or connected thereto. The representation of the bus 1005 is not limitative and in particular the central unit 1010 is able to communicate instructions to any element of the device 1000 directly or by means of another element of the device 1000.

The memory cards 1045 can be replaced by any information carrier such as for example a compact disk (CD-ROM), rewritable or not, a ZIP disk, a USB key or a floppy. In general terms, an information storage means able to be read by microcomputer or by a microprocessor, integrated or not in the information processing device, possible removable, is adapted to store one or more programs, the execution of which enables the method according to the invention to be implemented.

The executable code enabling the information processing device to implement the invention can be stored either in read only memory 1015, on the hard disk 1035 or on a removable digital medium such as for example a memory card 1045 as described previously. According to a variant, the executable code of the programs is received by means of the telecommunication network, via the interface 1050, in order to be stored in one of the storage means of the device 1000 (such as the hard disk 1035 for example) before being executed.

The central unit 1010 controls and directs the execution of the instructions or portions of software code of the program or programs of the invention, the instructions or portions of software code being stored in one of the aforementioned storage means. When the device 1000 is powered up, the program or programs that are stored in a non-volatile memory, for example the hard disk 1035 or read only memory 1015, are transferred into the random access memory 1020, which then contains the executable code of the program or programs of the invention, as well as registers for storing the variables and parameters necessary for implementing the invention.

It should also be noted that the coding and decoding devices implementing the invention or incorporating it can also be produced in the form of programmable apparatus. For example, such devices can then contain the code of the computer program or programs in a fixed form in an application specific integrated circuit (ASIC).

The device described here and in particular the central unit 1010 are able to implement all or some of the processing operations described in relation to FIGS. 1 to 10, in order to implement each method that is the object of the present invention and constitute each device that is the object of the present invention.

The above examples are merely embodiments of the invention, which is not limited thereby.

In particular, the marking codes in 1 or 2 bits defined above are well adapted to the processing of rather irregular XML documents 100. This is because it is considered that the events 102 will most frequently define new grammars and/or predictions (because of the irregularity). In the case of XML documents 100 having a regular structure with a large number of repetitions, it would rather be necessary to define short marking codes in the case of non-contribution to updates: for example the codes 11 (instead of 1) 10 (instead of 01) and 0 (instead of 00) in order to favor events modifying neither the grammars 208 nor the dictionaries of values 214.

Although, in the above examples, the position of the EXI events 110 in the index 106 is calculated by event step (that is to say the position is incremented by 1 for each new event), it can be envisaged giving information on this position by indicating, for example during step E514, the number of bits already written by the bit generator 220. In this configuration, the decoder 700 will no longer need to delimit each EXI event 110 in the bit stream 108, but merely count the bits in each payload of the stream.

Equally, this position posi indexed during step E430 may correspond to the position of the priority code of the indexed EXI event rather than to the first bit corresponding to its content. This mode allows verification of the synchronization of the grammars 208 of the decoder 700 with the position in the bit stream 108.

Moreover, the decoding of the index 106 and its filtering (step E810 and FIG. 10) can be combined in a single step for more efficiency. This makes it possible to avoid the decoding of EXI events indexed with a position greater than or equal to the start of reconstruction position.

In one embodiment, the conventional decoding E814 allowing the reconstruction of the XML fragment 114 can take place using the filtered index 150 based on the end of fragment position to be reconstructed, that is to say if, in constructing the index, there was considered to be the target position, during step E900, not the position corresponding to the start of the fragment to be reconstructed but the position corresponding to the EXI event following the last event corresponding to the XML fragment to be reconstructed, and subject to assigning to the events corresponding to the fragment a specific marking indicating a reconstruction mode to the fast decoder.

The invention claimed is:

1. A method of coding a structured document as a bitstream, including:
    coding hierarchized events included in the structured document into coded events using at least one encoding table, the at least one encoding table associating hierarchized events with corresponding coded events and being updated upon coding the first occurrence of hierarchized events of the structured document;
    forming an update involvement table in a bitstream that comprises, for a plurality of coded events, information representing involvement or non-involvement of corresponding hierarchized events at an update of the at least one encoding table, wherein forming the update involvement table comprises:
    determining one or more hierarchized events included in the structured document that are involved in an update of the at least one encoding table, and
    associating marking information representing the involvement with the coded events corresponding to the one or more determined hierarchized events; and
    generating a bitstream for a decoder including the coded events and the update involvement table, wherein the bitstream does not include the at least one encoding table,
    wherein at least one central processing unit (CPU) performs at least one of the steps.

2. The method according to claim 1, wherein the update involvement table further comprises, for each coded event of the plurality of coded events, information representing a position of the coded event in the bitstream.

3. The method according to claim 2, wherein the plurality of the coded events includes a plurality of hierarchized events relating to a structure of the structured document, and the update involvement table includes, for each of the coded events relating to content of the structured document, information representing the position of the coded event in the bitstream.

4. The method according to claim 2, wherein the update involvement table includes, for each of the plurality of the coded events, identification data for a name of a corresponding hierarchized event.

5. The method according to claim 2, wherein the update involvement table includes information, for each of the plurality of the coded events, a corresponding type of the coded event and a depth of the coded event in a hierarchical structure of the structured document.

6. The method according to claim 2, comprising inserting the update involvement table in a header of the bitstream.

7. The method according to claim 1, wherein the at least one encoding table includes a structure event encoding table and a character string encoding table, and the information representing the involvement takes a different value for representing involvement of an update of at least one encoding table including the structure event encoding table and for representing involvement of an update solely of the character string encoding table.

8. The method according to claim 1, further comprising compressing the update involvement table before generating the bitstream.

9. The method according to claim 8, wherein the update involvement table gives information, for each coded event in the plurality of coded events, on a corresponding type of the coded event and a depth of the coded event in a hierarchical structure of the structured document, and
wherein the compressing includes:
grouping together entries of the update involvement table according to a corresponding type of event and a depth of a corresponding event in a hierarchical structure of the structured document, and
coding each of a plurality of groups independently.

10. The method according to claim 8, wherein compressing comprises:
coding entries of the update involvement table where a depth of a corresponding coded event in a hierarchical structure of the structured document is less than a threshold depth, and
coding entries of the update involvement table with a depth greater than or equal to the threshold depth, and
wherein information representing involvement corresponds to the update of the at least one encoding table.

11. A non-transitory computer-readable storage medium storing computer-executable instructions that, when executed by a computer, cause the computer to perform the method according to claim 1.

12. A method of decoding a portion of a bitstream including coded events coding a structured document comprised of hierarchized events, the method comprising:
obtaining, from the bitstream, an update involvement table that comprises, for a plurality of coded events, information representing involvement or non-involvement of corresponding hierarchized events at an update of at least one encoding table;
determining, using the update involvement table, coded events in the bitstream that are associated with marking information representing the involvement of the determined coded events at the update of the at least one decoding table;
constructing the at least one decoding table by decoding solely, in the bitstream, the determined coded events, wherein the at least one encoding table associates coded events with corresponding hierarchized events; and
decoding the portion of the bitstream using the at least one decoding table to obtain decoded hierarchized events,
wherein at least one central processing unit (CPU) performs at least one of the steps.

13. The method according to claim 12, wherein the update involvement table further comprises, for each coded event of the plurality of coded events, information representing a position of the coded event in the bitstream.

14. The method according to claim 13, comprising filtering the update involvement table to keep only coded events corresponding to a position preceding that of a first event of the portion of the bitstream to be accessed.

15. The method according to claim 14, wherein each of the coded events in the update involvement table are associated with depth information representing a depth of an event in a structure of the structured document, and further comprising filtering the update involvement table to keep only:
coded events associated with marking information of a first type, and
coded events that are ancestors, in the structure, of the first event to be accessed associated with marking information of a second type.

16. The method according to claim 13, comprising filtering the update involvement table to keep only coded events corresponding to a position preceding that of a last event of the portion of the bitstream to be accessed.

17. The method according to claim 12, wherein the constructing includes updating a plurality of decoding tables by adding decoding data associated with decoded events to the decoding tables, and wherein, prior to decoding a filtered coded event, determining at least one of the decoding tables to be updated, based on a type of the marking information.

18. The method according to claim 12, wherein the coded events of the update involvement table are associated with hierarchical depth information, and the method further comprises constructing and displaying a hierarchical structure, based on depth information, so that a user can, in the displayed structure, designate the portion of the bitstream to be decoded.

19. The method according to claim 12, wherein constructing the at least one decoding table by decoding solely the coded events comprises not decoding the coded events of the bitstream that are associated, in the update involvement table, with marking information representing non-involvement of the coded events at updates of the at least one decoding table.

20. A device for coding a structured document as a bitstream including:
a coding unit for coding hierarchized events included in the structured document into coded events using at least one encoding table, the at least one encoding table associating hierarchized events with corresponding coded events and being updated upon coding the first occurrence of hierarchized events of the structured document;
a forming unit for forming an update involvement table in a bitstream that comprises, for a plurality of coded events, information representing involvement or non-involvement of corresponding hierarchized events at an update of the at least one encoding table, wherein the forming unit comprises:

a determination unit constructed to determine one or more hierarchized events included in the structured document that are involved in an update of the at least one encoding table, and an association unit constructed to associate marking information representing the involvement with the coded events corresponding to the one or more hierarchized events determined by the determination unit; and a generating unit for generating a bitstream for a decoder including the coded events and the update involvement table, wherein the bitstream does not include the at least one encoding table, wherein at least one central processing unit (CPU) functions as at least one of the units.

21. A device for decoding a portion of a bitstream including coded events coding a structured document comprised of hierarchized events, the device comprising:

an obtaining unit constructed to obtain, from the bitstream, an update involvement table that comprises, for a plurality of coded events, information representing involvement or non-involvement of corresponding hierarchized events at an update of at least one decoding table;

a determination unit constructed to determine, using the update involvement table, coded events in the bitstream that are associated with marking information representing the involvement of the determined coded events at an update of the at least one encoding table;

a construction unit constructed to construct the at least one decoding table by decoding solely, in the bitstream, the coded events determined by the determination unit, wherein the at least one encoding table associates coded events with corresponding hierarchized events; and a decoding unit constructed to decode the portion of the bitstream using the at least one decoding table constructed by the construction unit to obtain decoded hierarchized events, wherein at least one central processing unit (CPU) functions as at least one of the units.

* * * * *